United States Patent [19]

Ozaki et al.

[11] Patent Number: 5,246,978
[45] Date of Patent: Sep. 21, 1993

[54] POLYOL AND RIGID POLYURETHANE FOAM

[75] Inventors: Satoshi Ozaki; Tsukuru Izukawa; Haruhiko Kawakami; Takayoshi Masuda, all of Aichi; Toshio Nozawa, Kanagawa, all of Japan

[73] Assignee: Mitsui Toatsu Chemicals, Inc., Tokyo, Japan

[21] Appl. No.: 610,689

[22] Filed: Nov. 8, 1990

[30] Foreign Application Priority Data

Dec. 5, 1989 [JP] Japan .................................. 1-314390
Dec. 5, 1989 [JP] Japan .................................. 1-314391

[51] Int. Cl.$^5$ ............................................. C08G 18/58
[52] U.S. Cl. ................................... 521/164; 521/170; 521/171; 521/172; 521/173; 521/174; 521/180; 523/400; 523/437; 523/438; 523/462; 528/103
[58] Field of Search ............... 521/164, 170, 171, 172, 521/173, 174, 180; 528/103; 523/462, 400, 437, 438

[56] References Cited

U.S. PATENT DOCUMENTS

| | | | |
|---|---|---|---|
| 4,195,151 | 3/1980 | Dunleavy et al. | 521/164 |
| 4,247,655 | 1/1981 | Dunleavy et al. | 521/164 |
| 4,323,658 | 4/1982 | Speranza et al. | 521/174 |
| 4,521,572 | 6/1985 | Cuscurida et al. | 521/167 |
| 4,535,133 | 8/1985 | Cuscurida et al. | 528/103 |
| 4,607,064 | 8/1986 | Kuhn et al. | 521/174 |
| 4,609,685 | 9/1986 | Cuscurida et al. | 521/167 |
| 4,710,521 | 12/1987 | Soukup et al. | 521/164 |
| 4,789,690 | 12/1988 | Milovanovic-Lerik et al. | 521/174 |
| 4,985,530 | 1/1991 | Murakami et al. | 528/103 |

FOREIGN PATENT DOCUMENTS

| | | |
|---|---|---|
| 0265225 | 4/1988 | European Pat. Off. . |
| 50-6648 | 1/1975 | Japan . |
| 63-139908 | 6/1988 | Japan . |
| 2-86613 | 3/1990 | Japan . |
| 2083058 | 3/1982 | United Kingdom . |

*Primary Examiner*—John Kight, III
*Assistant Examiner*—John M. Cooney, Jr.
*Attorney, Agent, or Firm*—Burns, Doane, Swecker & Mathis

[57] ABSTRACT

The present invention relates to a polyol, polyurethane resin, rigid polyurethane foam, preparation process thereof and a preparation process of a rigid polyurethane foam composite. The polyol comprises an epoxy resin based polyol, which may be combined with a phenol resin based polyol component and/or an aromatic amine based polyol component. The polyurethane resin, foam and composite using the polyol as a raw material has resistance to dissolution in a hydrochlorofluorocarbon and a hydrofluorocarbon which are foaming agents having very low public environmental hazards and can be used as a thermal insulation material or a thermal insulation structure for refrigerators, freezers, insulation panels, ships and vehicles.

41 Claims, No Drawings

POLYOL AND RIGID POLYURETHANE FOAM

BACKGROUND OF THE INVENTION

1. Field of the Invention

The present invention relates to a polyol, polyurethane resin, rigid polyurethane foam, preparation process thereof and a preparation process of a rigid polyurethane foam composite.

More particularly the polyol mixture of the present invention comprising an epoxy resin based polyol and a polyol component initiated with a single compound or a mixture thereof selected from phenol resin, aliphatic polyhydroxy compound, alkanolamine and aromatic amine is a raw material for preparing polyurethane resin having resistance to dissolution in hydrochlorofluorocarbons (hereinafter abbreviated as HCFC) and hydrofluorocarbons (hereinafter abbreviated as HFC) which are foaming agents causing very low public hazards. The polyol can provide rigid polyurethane foam and its composites thereof by using the above foaming agents.

The rigid polyurethane foam among them obtained above has excellent properties equivalent to those of conventional polyurethane foams obtained by the use of chlorofluorocarbons (hereinafter abbreviated as CFC) as foaming agents. Hence, the rigid polyurethane foam of the present invention is extremely useful for insulating materials or insulating structural materials of electric refrigerators, freezing warehouses, insulation panels, ships and vehicles.

2. Description of the Prior Art

In the present manufacturing process of polyurethane foams, CFC such as CFC-11 (trichlorofluoromethane) and CFC-12 (dichlorodifluoromethane) are generally used as foaming agents. These compounds have recently been recognized as materials causing environmental destruction such as disruption of the ozone layer or enhancement of the greenhouse effect. Accordingly, restriction has recently been imposed upon the manufacture and use of these compounds.

At the same time, HCFC such as HCFC-123 (2,2-dichloro-1,1,1-trifuluoroethane), HCFC-141b (1,1-dichloro-1-fluoroethane) HCFC-142b(1-chloro-1,1-difluoroethane), HCFC-22(1-chloro-1,1-difluoromethane) and additionally HFC such as HFC-134a (1,1,1,2-tetrafluoroethane) and HFC-152a (1,1-difluoroethane) which cause much less environmental destruction have been focused on as substitutes for CFC-11 and CFC-12 and the like. However, it was found that HCFC and HFC have higher dissolving powers for rigid polyurethane resins as compared with CFC, and hence have disadvantages of severely deteriorating the properties of the resulting rigid polyurethane foams, for example, reduction of closed cell content and foam strengths. Particularly it has been confirmed by the present inventors that in the manufacture of rigid polyurethane foams, HCFC and HFC dissolve the cell walls of closed cells in the course of foaming and drastically lower the heat insulation effect which is a characteristic property of rigid polyurethane foams.

Consequently, a novel polyurethane resin has been desired. The conventional polyoxyalkylene polyol (hereinafter abbreviated as polyol) used as the raw material for polyurethane resins decreases viscosity according to an increase in the amount of alkylene oxide added. As a result, operations in polyurethane resin production can be conducted with ease. However, excess addition of alkylene oxide leads to dissolution of polyurethane resin in HCFC and HFC, and tends to made application of these foaming agents substantially impossible. On the other hand, when the amount of alkylene oxide added is reduced, the polyol becomes solid or extremely viscous and solubility of polyol in other raw materials becomes poor. Thus the polyol is very difficult to handle.

As mentioned above, in order to maintain resistance to dissolution in HCFC and HCF, the operational efficiency in the rigid polyurethane foam production must be greatly sacrificed. Polyol which has a viscosity suitable for the foaming operation, good resistance to dissolution in HCFC and HFC and which is excellent in the mixing and dispersing ability in HCFC and HFC has never been found.

Tokkai-Sho 50-6698 (1975) has disclosed polyurethane foam which has good resistance to high temperatures using epoxy resin, polyol having hydroxyl value of from 300 to 550 mgKOH/g and CFC as the foaming agent.

Tokkai-Sho 63-139908 (1988) has disclosed an epoxy resin modified polyol having a molecular weight of from 2000 to 7000 and a flexible polyurethane foam for packing using CFC and low boiling point hydrocarbon as the foaming agent.

Tokkai-Hei 2-86613 (1990) has disclosed a flexible polyurethane foam using modified polyol obtained by reacting epoxy resin with polyamine or dialkanolamine in a polyol, which is subsequently reacted with organic polyisocyanate.

SUMMARY OF THE INVENTION

The present invention relates to a polyol, polyurethane resin, rigid polyurethane foam, preparation process thereof and a preparation process of a rigid polyurethane foam composite.

The polyol used in the present invention comprises an epoxy resin based polyol, which may be combined with a phenol resin based polyol component and/or aromatic amine based polyol component.

The above polyurethane resin, foam and composite using the above polyol as a raw material has resistance to dissolution in a hydrochlorofluorocarbon and a hydrofluorocarbon which are foaming agents having very low public environmental hazards.

The above-mentioned foam products have excellent physical properties equivalent to those of conventional polyurethane foams obtained by using chlorofluorocarbons, and hence are very useful as a thermal insulation material or a thermal insulation structure for refrigerators, freezers, insulation panels, ships and vehicles.

DETAILED DESCRIPTION OF THE INVENTION

The primary object of the present invention is to provide a polyol which gives equivalent operation efficiency in polyurethane foaming operations, particularly in the production of a rigid polyurethane foam, and equivalent foam properties compared with conventional CFC, even though HCFC and/or HFC having very low public environmental hazards are used.

As a result of an intensive investigation in order to achieve the above object, the present inventors have completed the present invention.

That is, the aspect of the present invention is illustrated by the following (1) to (6).

(1) A polyol (A) comprising polyol component (a) and polyol component (b); said polyol component (a) having a number average molecular weight of from 500 to 1800 and an average functionality of from 4 to 12 and being obtained by the addition of an alkylene oxide to a polymer (g2) resulting from the reaction of an active hydrogen containing compound(g) or an alkylene oxide adduct thereof(g1) with an epoxy resin represented by the formula (I):

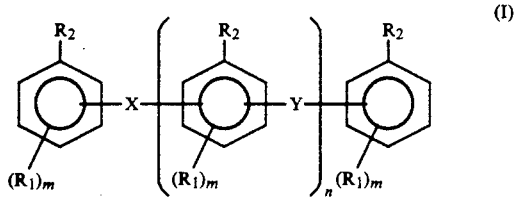

wherein $R_1$ is a hydrogen atom, alkyl having from 1 to 9 carbon atoms, chlorine, bromine, fluorine or a hydroxy, m is an integer of from 1 to 3, $R_2$ is a glycidyloxy or a glycidylamino, n is an integer of from 0 to 4, X and Y may be the same or different, and are a divalent group selected from the group consisting of an alkylene having from 1 to 10 carbon atoms, xylylene, oxy, thio and sulfonyl, or may be a combination of the above-mentioned groups; said polyol component (b) being obtained by the addition of an alkylene oxide to an active hydrogen containing compound(j), (2) A polyol (D) comprising the polyol (A) described in (1) and phenol resin based polyol component (B) and/or aromatic amine based polyol component (C).

(3) A polyurethane resin obtained by the reaction of a polyol with an organic polyisocyanate comprising using the polyol (A) or polyol (D) described in (1) or (2).

(4) A rigid polyurethane foam obtained by the reaction of an organic polyisocyanate with a resin premix comprising a polyol, foaming agent, catalyst, cell regulator and, where necessary, other additives, said polyol comprising the polyol (A) or polyol (D) described in (1) or (2), said foaming agent comprising one or more compounds selected from a hydrochlorofluorocarbon and a hydrofluorocarbon and additionally an auxiliary foaming agent, if necessary.

(5) A preparation process for the rigid polyurethane foam described in (4).

(6) A preparation process for a rigid polyurethane foam composite by reacting an organic polyisocyanate with a resin premix comprising a polyol, foaming agent, catalyst, cell regulator and, where necessary, other additives to form a rigid polyurethane foam on a facing material or in a cavity surrounded by a plurality of facing material, comprising using the polyol (A) or polyol (D) described in (1) or (2) and one or more of the foaming agents selected from the group consisting of a hydrochlorofluorocarbon and a hydrofluorocarbon and additionally an auxiliary foaming agent, if necessary.

Polyol (A) of the invention is mixture of polyol components (a) and (b). Polyol component (a) is initiated from polymer (g2) which is obtained by reacting the epoxy resin of the following formula (I) with a below described active hydrogen containing component (g) or an alkylene oxide adduct thereof (g1). An alkylene oxide is added to the polymer (g2) to obtain polyol component (a). Separately an alkylene oxide is added to a hydrogen containing compound (j) to obtain polyol component (b). The active hydrogen containing compounds (g) and (j) may be the same or different. The polyol components (a) and (b) thus obtained are then mixed to prepare polyol (A).

The epoxy resin used for the raw material of the epoxy resin base polyol (A) of the present invention is a compound represented by the formula (I):

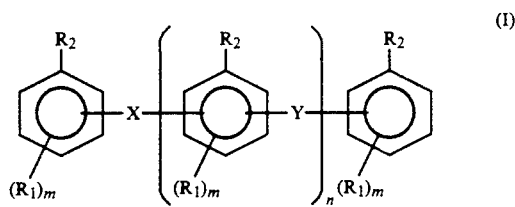

wherein $R_1$ is a hydrogen atom, alkyl having from 1 to 9, chlorine, bromine, fluorine or a hydroxy, m is an integer of from 1 to 3, $R_1$ is a glycidyloxy or a glycidylamino; n is an integer of from 0 to 4, and X and Y may be the same or different and are a divalent group selected from the group consisting of an alkylene having from 1 to 10 carbon atoms, xylylene, oxy, thio and sulfonyl, or may be a combination of the above-mentioned groups; said polyol component (b) being obtained by the addition of an alkylene oxide to an active hydrogen containing compound (j) which may be the same as or different from polyol(g).

The epoxy resin can be obtained, for example, by reacting epichlorohydrin with phenol derivatives such as bis(hydroxyphenyl)propane, bis(hydroxytolyl)propane, bis(ethylhydroxyphenyl)propane, bis(propylhydroxyphenyl)propane, bis(isopropylhydroxyphenyl)propane, bis(butylhydroxyphenyl)propane, bis(pentylhydroxyphenyl)propane, bis(chlorohydroxyphenyl)propane, bis(hydroxyphenyl)methane, bis(hydroxyphenyl)ethane, bis(hydroxyphenyl)propane, bis(hydroxyphenyl)butane, bis(hydroxyphenyl)pentane, bis(hydroxyphenyl)hexane, bis(hydroxyphenyl)heptane, bis(hydroxyphenyl)octane, bis(hydroxyphenyl)nonane, bis(hydroxyphenyl)ether, bis(hydroxyphenyl)sulfide, bis(hydroxyphenyl)sulfone, and novolak resin.

Particularly, bis(hydroxyphenyl)propane, bis(hydroxyphenyl)methane, bis(chlorohydroxyphenyl)propane, and novolak resin are preferable.

Other epoxy resins having glycidylamino groups can be obtained by reacting epichlorohydrin with the following compounds, for example, diphenylmethanediamine, bis(aminochlorophenyl)methane, polymethylenepolyphenylpolyamine, polyphenylpolyxylylenepolyamine, tolylenediamine, phenylenediamine, propylphenylenediamine, isopropylphenylenediamine butylphenylenediamine, aminophenol, diaminophenol, triaminophenol, aminohydroquinone, diaminohydroquinone, triaminohydroquinone, 2,2-(4-aminophenyl-4'-hydroxyphenyl) propane, tetraglycidyldiaminodiphenylmethane. Particularly desirable compounds among them are aminophenol, diphenylmethanediamine, tolylenediamine, phenylenediamine.

The alkylene oxide for use in the invention includes ethylene oxide, proxylene oxide and butylene oxide. These alkylene oxides may be used as a mixture.

Polymer (g2) which is the starting material of polyol component (a) can be obtained by reacting one equivalent of epoxy resin with 0.5 to 2.0 moles of aliphatic polyhydroxy compounds such as glycols polyhydric alcohols and polysaccharides having a functionality of 2 to 8, active hydrogen containing compounds (g) such as alkanolamine, or adducts thereof (g1) obtained by adding 3 moles or less of an alkylene oxide to one equivalent of the active hydrogen containing compounds (g)

When the above epoxy resin contains less than 2 epoxy groups in a molecule, the average functionality of the polymer (g2) is too small and reduces the strength of the resulting foam. An epoxy resin containing more than 6 epoxy groups has an increased functionality. However, the viscosity of the polymer (g2) increases and impairs operation efficiency.

The alkylene oxide addition number to the active hydrogen containing compound (g) is less than 3 moles per equivalent of active hydrogen. Alkylene oxide addition exceeding 3 moles reduces viscosity of the polymer (g2), but impairs physical properties of the foam.

Polyol component (a) for use in the invention can be prepared by the addition of from 0.5 to 3.0 moles of an alkylene oxide to 1 equivalent of active hydrogen in the above polymer (g2). It is preferable that polyol component (a) has a number average molecular weight (hereinafter abbreviated as Mn) of from 500 to 1800 and an average functionality of from 4 to 12. Alkylene oxide addition less than 0.5 mole causes unfavorable reduction in the properties of the resulting polyurethane foam. On, the other hand, when the alkylene oxide is added in an amount of more than 3 moles, the resulting polyurethane foam lowers resistance to dissolution in HCFC or HFC and has inferior physical properties of foam, although viscosity is reduced and dispersibility in HCFC and HFC is improved.

A number average molecular weight (Mn) less than 500 leads to too high a viscosity of polyol component (a). A number average molecular weight exceeding 1800 causes lowering of foam strengths. An average functionality less than 4 results in reduction of foam strengths. An average functionality exceeding 12 causes too high a viscosity of polyol component (a).

Any kind of active hydrogen containing compound which is commonly used for preparing a polyol as a raw material for polyurethane can be used. An aliphatic polyhydroxy compound or alkanolamine is preferred.

The aliphatic polyhydroxy compound used for the present invention is a single compound or a mixture of two more compounds selected from the group consisting of glycols polyhydric alcohols and polysaccharides having 2 to 8 a functionality of 2 to 8. Exemplary aliphatic polyhydroxy compounds include glycols such as ethylene glycol, diethylene glycol, propylene glycol, dipropylene glycol, butanediol, neopentyl glycol, cyclohexane dimethanol and cyclohexane tetramethanol; polyhydric alcohols such as glycerol, trimethylolethane, trimethylolpropane, and pentaerythritol; and polysaccharides such as methylglucoside, sorbitol, mannitol, dulcitol and sucrose.

The alkanolamine for use in the present invention is represented by the formula (II):

$$NR_3R_3R_4 \qquad (II)$$

wherein $R_3$ and $R_4$ are individually a hydrogen atom, hydroxyethyl or hydroxyisopropyl, (they may be the same or different) excluding the case wherein both $R_3$ and $R_4$ are hydrogen atoms. Exemplary alkanolamines include monoethanolamine, diethanolamine, triethanolamine, monoisopropanolamine, diisopropanolamine and triisopropanolamine.

Polyol component (b) used in the epoxy resin base polyol (A) of the invention is obtained by the addition of from 0.5 to 3.0 moles of an alkylene oxide to 1 equivalent of active hydrogen in the active hydrogen containing compounds (j) including polyhydroxy compounds such as the above glycols, polyhydric alcohols and polysaccharides and alkanolamines. Here, compounds (j) and afore-mentioned compound (g) may be the same or different.

When the alkylene oxide addition is less than 0.5 mole per equivalent of the active hydrogen in said active hydrogen containing compound, the crosslinking activity of said active hydrogen containing compound remains and hence deteriorates the physical properties of the resulting polyurethane foam. The amount of the alkylene oxide exceeding 3.0 moles also decreases foam properties even in a polyol mixing ratio (a)/(b) of 4.0 by weight as described below. The resulting polyurethane foam cannot be practically used.

The above polyol components (a) and (b) are preferably mixed in a ratio (a)/(b) of from 0.1 to 4.0 by weight. A mixing ratio exceeding 4.0 causes high viscosity and poor dispersibility in HCFC and HFC and also leads to operational problems in the preparation of the polyurethane resin. On the other hand, the mixing ratio less than 0.1 is unsuitable because of inferior properties of the resulting polyurethane foams.

Another polyol (D) of the invention comprises the above polyol (A) and phenol resin polyol component (B) and/or, aromatic amine polyol component (C). The above polyol component (B) comprises polyol component (a1) obtained by the addition of alkylene oxide to the phenol resin represented by the formula (III) illustrated below and polyol component (b1) obtained by the addition of alkylene oxide to the above alkanolamine or polyol component (c1) obtained by the addition of alkylene oxide to the above aliphatic polyhydroxy compound.

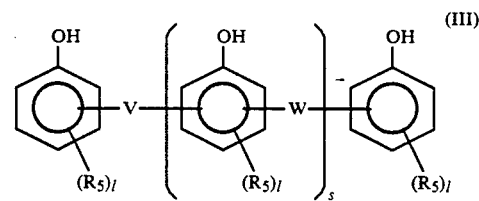

wherein $R_5$ is a hydrogen atom, alkyl having from 1 to 9 carbon atoms, chlorine, bromine, fluorine or hydroxy, l is an integer of from 1 to 3, S is an integer of from 1 to 6, and V and W are the same or different divalent group selected from the group consisting of an alkylene having from 1 to 10 carbon atoms, xylylene, oxy, thio and sulfonyl, or may be a combination of the above-mentioned groups.

The phenol resin generally used in the preparation of polyol component (a1) which is one component constituting phenol resin initiated polyol component (B) has Mn of from 650 to 1400 and an average functionality of from 3 to 8, and includes, for example, reaction products of phenols such as phenol, cresol, ethylphenol, propylphenol, isopropylphenol, butylphenol, pentylphenol, hexylphenol, heptylphenol, octylphenol, nonylphenol, chlorophenol, dichlorophenol, resorcinol, hydroquinone, catechol, guaiacol, bis(hydroxyphenyl)propane, bis(hydroxyphenyl)sulfide, bis(hydroxyphenyl)sulfone, with aldehydes such as aldehydes or $\alpha,\alpha'$-dimethoxyxylene, $\alpha,\alpha'$-dichloroxylene or sulfur. The reaction is carried out by known methods.

Preferred phenol resins include, for example, novolak resins having (Mn) of from 650 to 900 and an average functionality of from 3 to 8 in the formula (III), and a softening point of from 75° to 115° C.

When the molar amount of alkylene oxide addition to obtain polyol component (a1) is increased, resistance to dissolution) in HCFC and HFC is generally decreased.

When the (Mn) of the phenol resin is less than 650, the polyurethane resin derived from the phenol resin dissolves in HCFC and HFC, even though the molar addition is 1 mole per equivalent of hydroxyl group in the phenol resin. A (Mn) of the phenol resin exceeding 1400 leads to high viscosity in any mixing ratio, poor dispersibility in HCFC and HFC, inferior operational efficiency in the reaction, and complex handling procedures required for uniform admixture Of polyol containing alkanolamine initiated polyol component (b1) or aliphatic polyhydroxy compound initiated polyol component (c1) with an organic polyisocyanate. Resistance of the polyurethane resin to dissolution in HCFC or HFC is unfavorably poor.

The polyol component (a1) of the invention is obtained by the addition of 1.0 to 4.5 moles of alkylene oxide to 1 equivalent of the hydroxyl group in the phenol resin and has a hydroxyl value of 145 to 350 mgKOH/g. Alkylene oxide of less than 1.0 mole per equivalent of phenolic hydroxyl group, that is, an excess of remaining hydroxyl groups leads to unfavorable deterioration of physical properties in the resulting polyurethane foam. On the other hand, alkylene oxide addition exceeding 4.5 moles eliminates resistance of polyurethane resin to dissolution in HCFC or HFC, although viscosity is reduced and dispersibility in HCFC or HFC increases.

When the phenol resin has an average functionality of less than 3, the polyurethane resin prepared by reacting an organic polyisocyanate with a polyol containing alkanolamine initiated polyol component (b1) or aliphatic polyhydroxy compound initiated polyol component (c1) decreases resistance to dissolution in HCFC or HFC. On the other hand, an average functionality exceeding 8 leads to a disadvantage of rendering the polyurethane resin brittle.

The alkanolamine used for the polyol component (b1) of the invention is represented by the above formula (II).

The polyol component (b1) is obtained by the addition of 0.5 to 3.0 moles of alkylene oxide to 1 equivalent of active hydrogen in the alkanolamine and has a hydroxyl value of 240 to 800 mgKOH/g.

When the amount of alkylene oxides is less than 0.5 mole per equivalent of active hydrogen in alkanolamine, crosslinking activity of alkanolamine remains and hence deteriorates physical properties of resulting polyurethane foam. The amount of alkylene oxide exceeding 3.0 moles also decreases foam properties to render the foam impossible to use.

The mixing ratio (a1)/(b1) by weight, that is, the ratio of polyol component (a1) to that of (b1) in polyol component (B) is preferably 0.25 to 4.0. A mixing ratio exceeding 4.0 leads to a high viscosity and deterioration of dispersibility in HCFC and HFC, and causes unfavorable problems on operational efficiency in the preparation of the polyurethane resin.

The aliphatic polyhydroxy compound which is the starting material of polyol components (c1) is as described above.

Preferred polyol component (c1) has an alkylene oxide addition number Of 0.5 to 6.5 moles per equivalent of hydroxyl group in the aliphatic polyhydroxy compound and a hydroxyl value of 130 to 750 myKOH/g. An amount of less than 0.5 mole makes the polyurethane foam brittle. On the other hand, an amount exceeding 6.5 moles decreases resistance of the polyurethane resin to dissolution in HCFC or HFC.

A mixing ratio (a1)/(c1) by weight, that is, the ratio of phenol resin initiated polyol component (a1) to aliphatic polyhydroxy compound initiated polyol (c1) in polyol component (B) in the invention is preferably 0.1 to 4.0. A mixing ratio less than 0.1 decreases resistance to dissolution in HCFC and HFC of the polyurethane resin obtained in the presence of a catalyst. A mixing ratio exceeding 4.0 leads to too high a viscosity and hence results in the disadvantage of poor operational efficiency in preparing the polyurethane resin.

The aromatic amine used for a raw material of the aromatic amine based polyol component (C) is a compound represented by the formula (IV) or (V):

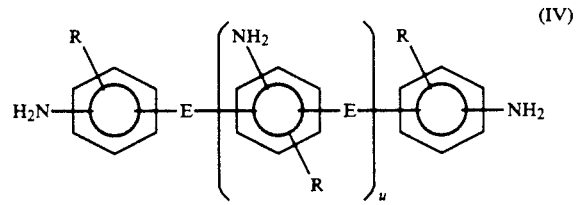

(IV)

wherein E is methylene, xylylene or ethylidene, R is a hydrogen atom, aliphatic hydrocarbon group having from 1 to 10 carbon atoms or alicyclic hydrocarbon group, and U is an integer of from 0 to 5,

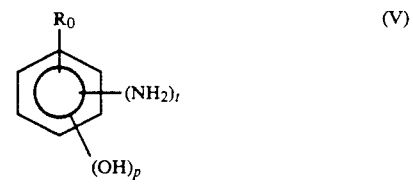

(V)

wherein $R_o$ is a hydrogen atom, chlorine, bromine, fluorine, aliphatic hydrocarbon group having from 1 to 10 carbon atoms or alicyclic hydrocarbon group, t is an integer of from 1 to 3, and p is an integer of from 0 to 2.

Exemplary aromatic amines include diphenylmethanediamine, bis(aminochlorophenyl)methane, polymethylenepolyphenylpolyamine, polyphenylpolyxylylenepolyamine, tolylenediamine, phenylenediamine, propylphenylenediamine, iso-propylphenylenediamine, butylphenylenediamine, pentylphenylenediamine, hexylphenylenediamine, heptylphenylenediamine, octylphenylenediamine, nonylphenylenediamine, cyclohexylphenylenediamine, aminophenol, diaminophenol, triaminophenol, aminohydroquinone, diaminohydroquinone, triaminohydroquinone.

Preferable compounds are diphenylmethanediamine, polymethylenepolyphenylpolyamine, polyphenylpolyxylylenepolyamine, tolylenediamine, aminophenol.

Polyol component (a2) of the invention is obtained by the addition of 1.0 to 9.0 moles of alkylene oxide to 1 equivalent of the active hydrogen in the above aromatic amine. The hydroxyl value of polyol (a2) is 50~600 mgKOH/g. Alkylene oxide of less than 1.0 mole, that is, an excess of remaining phenolic hydroxyl groups causes difficult control of the foaming reaction and unfavorable reduction of the physical properties in the resulting polyurethane foam. On the other hand, alkylene oxide addition exceeding 9.0 moles deteriorates physical properties of the resulting polyurethane foam, although viscosity is reduced and dispersibility in HCFC and HFC increases.

Polyol component (b1) used in the invention is obtained by the addition of 0.5 to 3.0 moles of alkylene oxide to 1 equivalent of active hydrogen in the alkanolamine.

When the amount of alkylene oxide is less than 0.5 mole per equivalent of active hydrogen of alkanolamine, the crosslinking activity of the alkanolamine remains and hence deteriorates the physical properties of the resulting polyurethane foam.

When the amount of alkylene oxide is in excess of 3.0 moles, foam properties are decreased even though the mixing ratio of polyol components (a2) and (b1) in polyol component (C), namely the ratio (a2)/(b1) by weight (P.S) exceeds 4.0, and the resulting foam cannot be used.

Polyol component (a2) and (b1) of polyol component (C) used in the invention are preferably used in a mixing ratio (a2)/(b1) of 0.25 to 4.0 by weight. A mixing ratio exceeding 4.0 causes high viscosity and poor dispersiblity in HCFC and HFC and also leads to unfavorable operational problems on the preparation of the polyurethane resin. On the other hand, a mixing ratio less than 0.25 is unsuitable because of inferior properties of the resulting polyurethane foams.

The aliphatic polyhydroxy compound used as a starting material for polyol component (c1) in the present invention can be the afore-mentioned compound.

Preferred mole amounts of alkylene oxide addition are from 0.5 to 6.5 moles per equivalent of the hydroxyl in the aliphatic polyhydroxy compound. Alkylene oxide addition of less than 0.5 mole makes the resultant polyurethane foam brittle. On the other hand, an amount exceeding 6.5 moles lowers resistance to dissolution in HCFC and HFC of the polyurethane resin obtained.

The polyol components (a2) and (c1) which are initiated with the aromatic amine and the aliphatic polyhydroxy compound, respectively, are preferably mixed in the ratio (a2)/(c1) of 0.1 to 4.0 by weight. A mixing ratio less than 0.1 reduces resistance to dissolution in HCFC and HFC of the polyurethane resin prepared by reacting in the presence of a catalyst. On the other hand, a mixing ratio exceeding 4.0 leads to the disadvantage of poor operational efficiency due to too high a viscosity in the preparation of the polyurethane resin.

The mixing ratios of polyol component (B) and/or polyol component (C) which are mixed with polyol (A) used in the present invention, that is, the ratios (B)/(A), (C)/(A) or [(B)+(C)]/(A) are in the range of from 0.1 to 4.0 by weight. Polyol (D) of the invention which contains polyol (A) and additionally polyol component (B) and/or polyol component (C) in the above weight ratio provides heat conductivity of the resulting foam almost equal to that of polyol (A) alone. However, a weight ratio exceeding 4.0 increases heat conductivity. The addition of polyol component (B) and/or polyol component (C) to polyol (A) further improves the strength low temperature dimensional stability of the foam derived from polyol (A) alone. However, a weight ratio less than 0.1 has a small effect. Consequently, the above range of weight ratio is preferred.

The proportion between polyol component (B) and polyol component (C) in admixture with polyol (A) is (B)=100−(C) by weight. Since the effect of polyol component (B) and polyol component (C) on the foam property is similar, either one or both of the polyol components may be mixed in the above range of proportion by weight.

The catalysts which can be used in the alkylene oxide addition for the preparation of polyol components (a), (a1), (a2), (b), (b1), (c1) and (g1), i.e., polyol components for constituting polyol (A), polyol (B) and components (C) are an amine catalyst and an alkali metal hydroxide catalyst.

The amine catalyst is represented by the formula (VI) or the formula (VII):

$$NR_6R_6R_7 \quad (VI)$$

$$R_6R_7N(CH_2)_i NR_6R_7 \quad (VII)$$

wherein $R_6$ and $R_7$ are a hydrogen atom or a group selected from a group consisting of alkyl group having from 1 to 6 carbon atoms, hydroxyethyl and hydroxyisopropyl, but $R_6$ and $R_7$ cannot be hydrogen atoms at the same time in the formula (VI), and i is an integer of from 1 to 6.

Exemplary amine compounds include dibutylamine, ethylenediamine, tetramethylenediamine, monoethanolamine, diethanolamine, triethanolamine, isopropanolamine, triethylamine, tri-n propylamine, di-n-propylamine, n-propylamine, n-amylamine, N,N-dimethylethanolamine, isobutylamine, isoamylamine and methyldiethylamine.

Alkali metal hydroxide can also be used as the catalyst for the above addition reaction. Representative examples of alkali metal hydroxide include lithium hydroxide, sodium hydroxide, potassium hydroxide, magnesium hydroxide, calcium hydroxide and barium hydroxide.

The above amine and alkali metal hydroxide catalysts can be used singly or in combination.

The amount of the above catalyst used for the invention is from 0.1 to 2.0 parts by weight per 100 parts by weight of the sum of the starting materials of polyol components (a), (a1), (a2), (b), (b1), (c1) or (g1).

In the case of using an alkali metal hydroxide catalyst, the reacted solution is neutralized by the acidic aqueous solution such as phosphoric acid aqueous solution.

In the preparation process for the polyol used in the invention, a single compound or a mixture thereof selected from phenol resin, aromatic amine, alkanolamine and aliphatic polyhydroxy compound is charged in an autoclave and used as a starting material. Epoxy resin is previously reacted with alkanolamine or aliphatic polyhydroxy compound and the reaction product is used as a starting material.

Then alkylene oxide is gradually fed to the autoclave to conduct a addition reaction. Preferred reaction temperature is 90° to 130° C. The temperature of lower than, 90° C. results in a slow reaction. On the other hand, a temperature exceeding 130° C. is liable to cause side reactions.

No particular restriction is imposed upon the organic polyisocyanate used in the process of the invention.

Conventionally known organic polyisocyanates, for example, aromatic, aliphatic and alicyclic polyisocyanates and their modified products can be used. Exemplary polyisocyanates which are suitable for use include phenylenediisocyanate, diphenylmethanediisocyanate, crude diphenylmethanediisocyanate, tolylenediisocyanate, crude tolylenediisocyanate, xylylenediisocyanate, hexamethylenediisocyanate, isophoronediisocyanate, hydrogenated di phenylmethanediisocyanate, hydrogenated tolylenediisocyanate, triphenylmethanetriisocyanate, tolylenetriisocyanate, polymethylenepolyphenylpolyisocyanate, modified polyisocyanates such as carbodiimide modified diphenylmethane diisocyanate, and isocyanate terminated prepolymers which can be obtained by reacting the above polyisocyanate with polyol or polymer polyol in a NCO/active hydrogen equivalent ratio of from 2 to 20 and have an isocyanate content of from 5 to 35% by weight.

These polyisocyanates can be used singly or in combination.

The equivalent ratio of the polyisocyanate to the hydroxyl group in the resin premix is in the range of from 0.8 to 5.0. An equivalent ratio exceeding 5.0 leads to unreacted polyisocyanate. On the other hand, an equivalent ratio less than 0.8 results in unreacted polyol. Hence the above range is preferable.

The foaming agent for use in the invention is HCFC or HFC.

Exemplary HCFC's include HCFC-123, HCFC-141b, HCFC-142b or HCFC-22. Exemplary HFC's include HFC-134a, or HFC-152a. These foaming agents can be used singly or in combination.

When necessary, water and/or low boiling point compound and other auxiliary foaming agents can be used in combination.

Water is usually used in an amount of from 0.5 to 5.0 parts by weight per 100 parts by weight of the resin premix. Exemplary low boiling point compound includes methylene chloride and other low boiling point hydrocarbons (boiling point is from 10° to 50° C.) and their mixtures. Conventional CFC can also be used in combination.

The catalyst which can be used for the preparation of the rigid polyurethane foam of the invention includes, for example, amine catalyst such as triethylamine, tripropylamine, triisopropanolamine, tributylamine, trioctylamine, hexadecyldimethylamine, N-methylmorpholine, N-ethylmorpholine, N-octadecylmorpholine, monoethanolamine, diethanolamine, triethanolamine, N-methyldiethanolamine, N,N-dimethylethanolamine, diethylenetriamine, N,N,N',N'-tetramethylethylenediamine, N,N,N',N'-tetramethylpropylenediamine, N,N,N',N'-tetramethylbutanediamine, N,N,N',N'-tetramethyl-1,3-butanediamine, N,N,N',N'-tetramethylhexamethylenediamine, bis [2-(N,N-dimethylamino)ethyl] ether, N,N-dimethylbenzylamine, N,N-dimethylcyclohexylamine, N,N,N',N'',N''-pentamethyldiethylenetriamine, triethylenediamine, formic acid and other acid salts of triethylenediamine, oxyalkylene adducts of amino groups in primary and secondary amines, aza ring compounds such as N,N-dialkylpiperazines, and various N,N',N''-trialkylaminoalkyl-hexahydrotriazines such as β-aminocarbonyl catalyst disclosed in Japanese Tokko-SHO 52-043517 (1977) and β-aminonitrile catalysts disclosed in Japanese Tokko-SHO 53-014279 (1978); and organometallic urethane catalysts such as tin acetate, stannous octoate, stannous oleate, stannous laurate, dibutyltin diacetate, dibutyltin dilaurate, dibutyltin dichloride, lead octoate, lead naphthenate, nickel naphthenate and cobalt naphthenate.

These catalysts can be used singly or in combination. The amount of the catalyst for use is in the range of from 0.0001 to 10.0 parts by weight per 100 parts of the polyol.

The cell regulator for use in the present invention is a conventionally known organic silicone surfactant. Exemplary cell regulators include products of Nippon Unicar Co., Ltd. which are L-520, L-540, L-5340, L-5410, L-5420, L-5710, and L-5720, products of Toray Silicone Co., Ltd. which are SH-190, SH-192, SH-193, SH-194, and SH-195, products of Shinetsu Silicone Co., Ltd. which are F-305, F-306, F-317, F-341 and F 345, and a product of Toshiba Silicone Co., Ltd. which is TFA 4200.

The amount of the cell regulator used is in the range of from 0.1 to 20 parts by weight per 100 parts by weight of the sum of the polyol and the organic polyisocyanate.

Flame retardants which can be used are tris(2-chloroethyl)-phosphate, tris(dichlopropyl)phosphate, tris(dibromopropyl)-phosphate, products of Daihachi Chemical Co., Ltd. which are CR-505 and CR-507, and a product of Akuzo Japan Co., Ltd. which is Fyrol-6.

Other additives usually employed in polyurethane, for example, plasticizers, fillers, stabilizers such as antioxidants, ultraviolet absorbers and colorants can also be added, if necessary.

In order to practice the present invention, the polyol, catalyst, cell regulator, flame retardant, foaming agent such as HCFC or HFC and other additives are mixed in a prescribed amount to form a premix.

Using a polyurethane dispensing machine, the resin premix is rapidly and continuously mixed with the organic polyisocyanate at a constant ratio so as to obtain a NCO/active hydrogen equivalent ratio of from 0.8 to 5.0.

The mixture obtained is successively poured into a cavity or a mold, or spread on a plate. After pouring or spreading, liquid raw material of the rigid polyurethane foam is foamed and cured in a several minutes.

The rigid polyurethane foam obtained in the present invention is used for heat insulation material or structural material for refrigerators, heat-insulating panels, ships and vehicles.

EXAMPLE

The present invention will hereinafter be illustrated further in detail by way of examples and comparative examples. [Polyol preparation] (Table 1–Table 4)

Polyol A-1 (Table 1)

To a 2 1 autoclave, 374 g of bisphenol-A diglycidylether (Trademark; Epikote 828, a product of Yuka Shell Epoxy Co.) and 210 g of diethanolamine were charged. After replacing the atmosphere with nitrogen, 2.2 g of triethylamine was added and reacted at 100° for 2 hours. After finishing the reaction, 174 g of propylene oxide was gradually added and reacted for 3 hours. After finishing the reaction, unreacted propylene oxide was removed from the reaction system. Polyol component (a-1) thus obtained was 758 g and had a hydroxyl value of 444 mgKOH/g.

To a 2 1 autoclave, 745 g of triethanolamine was charged and the atmosphere was replaced by nitrogen. Then 435 g of propylene oxide was gradually charged at 120° and reacted for 3 hours. Unreacted propylene oxide was removed from the reaction mixture to obtain polyol component (b-1) having a hydroxyl value of 713 mgKOH/g.

The propylene oxide addition number was 0.5 mole in both polyol component (a-1) and polyol component (b-1).

Polyol components (a-1) and (b-1) were mixed in a ratio (a-1)/(b-1)=1.0 by weight. Polyol (A-1) thus obtained had a hydroxyl value of 483 mgKOH/g, and a viscosity of 15700 cp/25° C.

By the same procedure as described in the polyol A-1 preparation, various polyols were obtained. Preparation conditions and physical properties are indicated in Tables 1~4.

TABLE 1

| Polyol (A) | | | | | | | | |
|---|---|---|---|---|---|---|---|---|
| | Example | | | | | | | |
| Mixed polyol (mark) | A-1 | A-2 | A-3 | A-4 | A-5 | A-6 | A-7 | A-8 |
| Polyol component (a) | | | | | | | | |
| Epoxy resin (g) | 374 | 374 | 374 | 374 | 374 | 374 | 801 | 422 |
| (No.: indicated in Note) | (1) | (1) | (1) | (1) | (1) | (1) | (2) | (3) |
| Active hydrogen containg compound (g) | | | | | | | | |
| Dietholamine | 210 | 210 | 210 | 210 | | | 525 | 420 |
| Glycerol | | | | | 184 | | | |
| Mitsui polyol (a) | | | | | | 612 | | |
| Mitsui polyol (b) | | | | | | | | |
| Active hydrogen radical/Epoxy radical | 1.0 | ← | ← | ← | ← | ← | ← | ← |
| Alkylene oxide (g) | | | | | | | | |
| Propylene oxide | 174 | 696 | 696 | 696 | 696 | 696 | 1740 | 2234 |
| Alkylene oxide addition amount (mol/OHEq.) | 0.5 | 2.0 | 2.0 | 2.0 | 2.0 | 2.0 | 2.0 | 2.0 |
| OH-value (mgKOH/g) | 444 | 263 | 263 | 263 | 268 | 200 | 275 | 293 |
| Polyol component (b) (g) | | | | | | | | |
| Triethanolamine | 745 | 745 | 745 | | | 745 | | 745 |
| Pentaerythritol | | | | 384 | | | 384 | |
| Glycerol | | | | | 644 | | | |
| Alkylene oxide (g) | | | | | | | | |
| Propylene oxide | 435 | 870 | 870 | 1392 | 609 | 870 | 1392 | 435 |
| Alkylene oxide addition amount (mol/OHEq.) | 0.5 | 1.0 | 4.0 | 3.0 | 0.5 | 1.0 | 3.0 | 0.5 |
| OH-value (mgKOH/g) | 713 | 521 | 521 | 253 | 940 | 521 | 253 | 713 |
| Mixed Polyol (a) + (b) = (A) | | | | | | | | |
| Mixing ratio (a)/(b) | 1.0 | 1.0 | 4.0 | 0.1 | 2.0 | 1.0 | 3.0 | 3.0 |
| OH-value (mgKOH/g) | 483 | 392 | 314 | 254 | 492 | 361 | 270 | 398 |
| Viscosity (cp/25° C.) | 15700 | 17800 | 14200 | 21500 | 15600 | 19700 | 13200 | 12700 |

| | Comparative Example | | | | | | |
|---|---|---|---|---|---|---|---|
| Mixed polyol (mark) | A-9 | A-10 | A-11 | A-12 | A-13 | A-14 | A-15 |
| Polyol component (a) | | | | | | | |
| Epoxy resin (g) | 374 | 374 | 374 | 374 | 374 | 374 | 374 |
| (No.: indicated in Note) | (1) | (1) | (1) | (1) | (1) | (1) | (1) |
| Active hydrogen containg compound (g) | | | | | | | |
| Dietholamine | | 210 | 210 | 210 | 210 | 210 | |
| Glycerol | | | | | | | |
| Mitsui polyol (a) | | | | | | | 612 |
| Mitsui polyol (b) | 2000 | | | | | | |
| Active hydrogen radical/Epoxy radical | ← | ← | ← | ← | ← | ← | ← |
| Alkylene oxide (g) | | | | | | | |
| Propylene oxide | 174 | 70 | 1396 | 174 | 174 | 174 | 696 |
| Alkylene oxide addition amount (mol/OHEq.) | 0.5 | 2.0 | 4.0 | 0.5 | 0.5 | 0.5 | 2.0 |
| OH-value (mgKOH/g) | 132 | 514 | 170 | 444 | 444 | 444 | 200 |
| Polyol component (b) (g) | | | | | | | |
| Triethanolamine | 745 | 745 | 745 | 745 | 149 | 745 | 745 |
| Pentaerythritol | | | | | | | |
| Glycerol | | | | | | | |
| Alkylene oxide (g) | | | | | | | |
| Propylene oxide | 435 | 435 | 435 | 350 | 696 | 435 | 870 |
| Alkylene oxide addition amount (mol/OHEq.) | 0.5 | 0.5 | 0.5 | 4.0 | 4.0 | 0.5 | 1.0 |
| OH-value (mgKOH/g) | 713 | 713 | 713 | 770 | 199 | 713 | 521 |
| Mixed Polyol (a) + (b) = (A) | | | | | | | |
| Mixing ratio (a)/(b) | 1.0 | 3.0 | 1.0 | 1.0 | 4.0 | 5.0 | 0.05 |
| OH-value (mgKOH/g) | 440 | 560 | 441 | 607 | 395 | 489 | 505 |
| Viscosity (cp/25° C.) | 19000 | 21000 | 9900 | 10000 | 18600 | 52000 | 1200 |

Note:
(1) Bisphenol based epoxy resin
(2) Novolak resin based resin
(3) Tetraglycidyldiaminodiphenylmethane
Mitsui polyol (a): MN300 Molecular weight 300
Mitsui polyol (b): NM1000 Molecular weight 1000
Eq.: Equivalent
Mixing ratio is indicated by weight (hereinafter the same)

TABLE 28

| | Polyol component (B) | | | | | |
|---|---|---|---|---|---|---|
| | Example | | | | | |
| Mixed polyol (mark) | B-1 | B-2 | B-3 | B-4 | B-5 | B-6 |
| Polyol component (a1) | | | | | | |
| Phenol resin (g) | | 500 | 500 | 500 | 500 | 500 | 500 |

TABLE 28-continued

| | Polyol component (B) | | | | | |
|---|---|---|---|---|---|---|
| | Example | | | | | |
| Mixed polyol (mark) | B-1 | B-2 | B-3 | B-4 | B-5 | B-6 |
| (No.: indicated in Note) | (2) | (2) | (3) | (2) | (2) | (1) |
| Alkylene oxide (g) | 821 | 247 | 547 | 821 | 300 | 1231 |
| Propylene oxide | | | | | | |
| Alkylene oxide addition amount (mol/OHEq.) | 3.1 | 1.0 | 1.9 | 3.1 | 1.1 | 4.4 |
| OH-value (mgKOH/g) | 198 | 339 | 250 | 198 | 320 | 153 |
| Polyol component (b1) (g) | | | | | | |
| Triethanolamine | 500 | 500 | 500 | 500 | 500 | 500 |
| Alkylene oxide | | | | | | |
| Propylene oxide | 292 | 292 | 1348 | 292 | 1752 | 1752 |
| Alkylene oxide addition amount (mol/OHEq.) | 0.5 | 0.5 | 2.3 | 0.5 | 3.0 | 3.0 |
| OH-value (mgKOH/g) | 713 | 713 | 327 | 713 | 253 | 253 |
| Mixed polyol (a1) + (b1) = (B) | | | | | | |
| Mixing ratio (a1)/(b1) | 0.25 | 1.0 | 0.43 | 4.0 | 2.0 | 1.5 |
| OH-value (mgKOH/g) | 615 | 532 | 298 | 302 | 295 | 193 |
| Viscosity (cp/25° C.) | 3600 | 19700 | 9670 | 28000 | 32500 | 18900 |

Note:
OH-value: hydroxyl value, JIS K 1557
Viscosity: JIS K 1557
(hereinafter the same)
(1) Novolak #1000HS a product of Mitsui Toatsu Chemicals, Inc.
(2) Novolak #2000 a product of Mitsui Toatsu Chemicals, Inc.
(3) Novolak #9000 a product of Mitsui Toatsu Chemicals, Inc. (hereinafter the same)

TABLE 3

| | Polyol component (B) | | |
|---|---|---|---|
| | Example | | |
| Mixed polyol (mark) | B-7* | B-8 | B-9 |
| Polyol component (a1) | | | |
| Phenol resin (g) | 500 | 500 | 500 |
| (No.: indicated in Table 2) | (2) | (4) | (2) |
| Alkylene oxide (g) | 821 | 305 | 300 |
| Propylene oxide | | | |
| Alkylene oxide addition amount (mol/OHEq) | 3.1 | 1.2 | 1.1 |
| OH-value (mgKOH/g) | 198 | 296 | 320 |
| Polyol component (c1) | | | |
| Glycerol (g) | 500 | 500 | |
| Trimethylolpropane (g) | | | 500 |
| Alkylene oxide (g) | 832 | 832 | 4230 |
| Propylene oxide | | | |
| Alkylene oxide addition amount (mol/OHEq) | 0.8 | 0.8 | 6.2 |
| OH-value (mgKOH/g) | 730 | 730 | 141 |
| Mixed polyol (a1) + (c1) = (B) | | | |
| Mixing ration (a1)/(c1) | 1.0 | 4.0 | 1.5 |
| OH-value (mgKOH/g) | 460 | 320 | 245 |
| Viscosity (cp/25° C.) | 6300 | 12700 | 4900 |

Note:
*Mixture of phenol resin (2) and glycerol is used as starting material (4) Cresol-/Novolak type resin

TABLE 4

| | Polyol component (C) | | | | | | | |
|---|---|---|---|---|---|---|---|---|
| | Example | | | | | | | |
| Mixed polyol (mark) | C-1 | C-2 | C-3 | C-4 | C-5 | C-6 | C-7 | C-8 |
| Polyol component (a2) (g) | | | | | | | | |
| Aromatic amine | 594 | 198 | 530 | 594 | 795 | 792 | 198 | 265 |
| (No.: indicated in Note) | (1) | (1) | (2) | (1) | (2) | (1) | (1) | (2) |
| Alkylene oxide (g) | | | | | | | | |
| Propylene oxide | 696 | 1044 | 302 | 696 | | 464 | 1044 | 1357 |
| Ethylene oxide | | | | | 686 | | | |
| Alkylene oxide addition amount (mol/OHEq.) | 2.0 | 9.0 | 1.0 | 2.0 | 2.0 | 1.0 | 9.0 | 9.0 |
| OH-value (mgKOH/g) | 520 | 180 | 701 | 520 | 590 | 723 | 186 | 182 |
| Polyol component (b1), (c1) (g) | | | | | | | | |
| Glycerol | 368 | 92 | | 400 | 276 | | | |
| Triethanolamine | | | 200 | | | 596 | 596 | 596 |
| Alkylene oxide (g) | | | | | | | | |
| Propylene oxide | 696 | 1131 | 1508 | 389 | | 348 | 1044 | 1044 |
| Ethylene oxide | | | | | 396 | | | |
| Alkylene oxide addition amount (mol/OHEq.) | 1.0 | 6.5 | 6.5 | 0.5 | 1.0 | 0.5 | 1.5 | 1.5 |
| OH-value (mgKOH/g) | 630 | 140 | 132 | 940 | 633 | 713 | 410 | 410 |
| Mixed polyol (a2) + (c1) or (a2) + (c1) | | | | | | | | |
| Mixing ratio (a2)/(c1) or (a2)/(b1) | 4.0 | 0.1 | 1.0 | 4.0 | 4.0 | 4.0 | 3.0 | 3.0 |
| OH-value | 542 | 144 | 416 | 604 | 599 | 721 | 242 | 241 |
| Viscosity (cp/25° C.) | 15000 | 11200 | 18300 | 22500 | 18500 | 23000 | 6500 | 7800 |

| | Example | | | | | | | |
|---|---|---|---|---|---|---|---|---|
| Mixed polyol (mark) | C-9 | C-10 | C-11 | C-12 | C-13 | C-14 | C-15 | C-16 |
| Polyol component (a2) (g) | | | | | | | | |
| Aromatic amine | 530 | 530 | 895 | 895 | 448 | 895 | 895 | 327 |
| (No.: indicated in Note) | (2) | (2) | (3) | (3) | (3) | (3) | (3) | (4) |
| Alkylene oxide (g) | | | | | | | | |

TABLE 4-continued

| | Polyol component (C) | | | | | | | |
|---|---|---|---|---|---|---|---|---|
| Propylene oxide | 777 | | 327 | 654 | 1437 | 327 | | 1044 |
| Ethylene oxide | 590 | | | | | 497 | | |
| Alkylene oxide addition amount (mol/OHEq.) | 256 | 258 | 1.0 | 2.0 | 9.0 | 1.0 | 2.0 | 2.0 |
| OH-value (mgKOH/g) | 451 | 516 | 518 | 408 | 164 | 518 | 455 | 368 |
| Polyol component (b1), (c1) (g) | | | | | | | | |
| Glycerol | | | 92 | 460 | | | | |
| Triethanolamine | 596 | 596 | | | 1043 | 298 | 1043 | 1043 |
| Alkylene oxide (g) | | | | | | | | |
| Propylene oxide | 696 | 1044 | 1131 | 696 | 609 | 1044 | 609 | 609 |
| Ethylene oxide | | | | | | | | |
| Alkylene oxide addition amount (mol/OHEq.) | 1.0 | 1.5 | 6.5 | 0.8 | 0.5 | 3.0 | 0.5 | 0.5 |
| OH-value (mgKOH/g) | 529 | 410 | 137 | 727 | 713 | 250 | 713 | 713 |
| Mixed polyol (a2) + (c1) or (a2) + (c1) | | | | | | | | |
| Mixing ratio (a2)/(c1) or (a2)/(b1) | 1.0 | 1.0 | 4.0 | 2.0 | 0.5 | 2.0 | 3.0 | 1.0 |
| OH-value | 490 | 463 | 441 | 514 | 536 | 429 | 519 | 541 |
| Viscosity (cp/25° C.) | 21500 | 19400 | 22500 | 10700 | 7500 | 8600 | 21500 | 9600 |

Note:
(1) MDA 220, a product of Mitsui Toatsu Chemicals, Inc. (MDA: polymethylenepolyphenylpolyamine)
(2) MDA 150, a product of Mitsui Toatsu Chemicals, Inc.
(3) Anilix ®:Polyphenylpolyxylylenepolyamine based; a product of Mitsui Toatsu Chemicals, Inc.
(4) Aminophenol Polyurethane Resin Preparation (Table 5~Table 9)

Polyurethane resin was prepared by reacting 12.00 g of polyol obtained in the examples and the comparative examples with an organic polyisocyanate MD1-CR (a product of Mitsui Toatsu Chemicals, Inc. having NCO content of 31.0%) in the presence of an amine catalyst Kaolizer No. 1 (trademark of Kao Co.) at room temperature according to the formulation illustrated in Table 5 to Table 9.

HCFC absorption was measured on the polyurethane resin thus obtained. Results are illustrated in Table 5 to Table 9.

TABLE 5

| | Polyurethane resin (Polyol (A) only) | | | | | | | |
|---|---|---|---|---|---|---|---|---|
| | Example | | | | | | | |
| | 1 | 2 | 3 | 4 | 5 | 6 | 7 | 8 |
| Polyol (A) | A-1 | A-2 | A-3 | A-4 | A-5 | A-6 | A-7 | A-8 |
| OH-value (mg/KOH/g) | 483 | 392 | 314 | 254 | 492 | 361 | 270 | 398 |
| Viscosity (cp/25° C.) | 15700 | 17800 | 14200 | 24500 | 15600 | 19700 | 13200 | 12700 |
| Formulation (g) | | | | | | | | |
| Polyol | 12.00 | ← | ← | ← | ← | ← | ← | ← |
| MDI-CR | 14.07 | 11.42 | 9.14 | 7.49 | 14.33 | 10.51 | 7.86 | 11.59 |
| Kaolizer No. 1 | 0.12 | ← | ← | ← | ← | ← | ← | ← |
| HCFC absorption | | | | | | | | |
| HCFC-123 | | | | | | | | |
| 0 hr | 36.07 | 23.41 | 21.15 | 19.40 | 26.33 | 22.51 | 19.86 | 23.59 |
| 24 hr | 36.09 | 23.46 | 21.23 | 19.40 | 26.33 | 22.58 | 19.94 | 23.69 |
| Absorption (%) | 0.1 | 0.2 | 0.4 | 0.0 | 0.0 | 0.3 | 0.4 | 0.4 |
| HCFC-141b | | | | | | | | |
| 0 hr | 36.07 | 23.42 | 21.15 | 19.40 | 26.33 | 22.51 | 19.86 | 23.59 |
| 24 hr | 36.09 | 23.44 | 21.23 | 19.40 | 26.33 | 22.60 | 19.96 | 23.66 |
| Absorption (%) | 0.1 | 0.1 | 0.3 | 0.0 | 0.0 | 0.4 | 0.5 | 0.3 |

| | Comparative Example | | | | | | |
|---|---|---|---|---|---|---|---|
| | 1 | 2 | 3 | 4 | 5 | 6 | 7 |
| Polyol (A) | A-9 | A-10 | A-11 | A-12 | A-13 | A-14 | A-15 |
| OH-value (mg/KOH/g) | 440 | 560 | 441 | 607 | 395 | 489 | 505 |
| Viscosity (cp/25° C.) | 19000 | 21000 | 9900 | 10000 | 18600 | 52000 | 1200 |
| Formulation (g) | | | | | | | |
| Polyol | ← | ← | ← | ← | ← | ← | ← |
| MDI-CR | 12.82 | 16.31 | 12.84 | 17.68 | 11.50 | 14.24 | 14.71 |
| Kaolizer No. 1 | ← | ← | ← | ← | ← | ← | ← |
| HCFC absorption | | | | | | | |
| HCFC-123 | | | | | | | |
| 0 hr | 24.82 | 28.31 | 24.84 | 29.68 | 23.50 | 26.24 | 26.71 |
| 24 hr | 25.19 | 28.91 | 25.84 | 29.83 | 25.10 | 26.37 | 26.90 |
| Absorption (%) | 1.5 | 2.1 | 4.0 | 0.5 | 6.8 | 0.5 | 0.7 |
| HCFC-141b | | | | | | | |
| 0 hr | 24.82 | 28.31 | 24.84 | 29.68 | 23.50 | 26.24 | 26.71 |
| 24 hr | 25.14 | 28.88 | 25.71 | 29.83 | 24.75 | 26.37 | 26.92 |

TABLE 5-continued

| | Polyurethane resin (Polyol (A) only) | | | | | | |
|---|---|---|---|---|---|---|---|
| Absorption (%) | 1.3 | 2.0 | 3.5 | 0.5 | 5.3 | 0.5 | 0.8 |

Note:
MDI-CR: Crude diphenylmethanediisocyanate, a product of MITSUI TOATSU CHEMICALS, INC.
Kaolizer No. 1: Amine based catalyst, a product of Kao Comp.
Absorption: Weight increase rate of a specimen of polyurethane resin having dimensions of 40 × 40 × 7~17 mm after immersion in 50 g of HCFC.

TABLE 6

| | Polyurethane resin (Polyol (A) + Polyol component (B)) | | | | | | | | | | | | |
|---|---|---|---|---|---|---|---|---|---|---|---|---|---|
| | Example | | | | | | | | | | | | |
| | 9 | 10 | 11 | 12 | 13 | 14 | 15 | 16 | 17 | 18 | 19 | 20 | 21 |
| Polyol (A) | A-6 | A-6 | A-6 | A-1 | A-1 | A-1 | A-4 | A-4 | A-4 | A-2 | A-2 | A-5 | A-5 |
| Polyol component (B) | B-2 | B-2 | B-2 | B-7 | B-7 | B-7 | B-7 | B-7 | B-7 | B-8 | B-8 | B-8 | B-8 |
| Mixing ratio (B)/(A) | 1.0 | 2.0 | 4.0 | 1.0 | 2.0 | 4.0 | 1.0 | 2.0 | 4.0 | 1.0 | 2.0 | 1.0 | 2.0 |
| OH-value (mgKOH/g) | 447 | 475 | 480 | 472 | 468 | 465 | 357 | 391 | 420 | 356 | 393 | 406 | 397 |
| Viscosity (cp/25° C.) | 19700 | 19800 | 19800 | 14100 | 11900 | 9200 | 20000 | 13100 | 9500 | 16800 | 14100 | 13400 | 12900 |
| Formulation (g) | | | | | | | | | | | | | |
| Polyol | 12.00 | ← | ← | ← | ← | ← | ← | ← | ← | ← | ← | ← | ← |
| MDI-CR | 12.90 | 13.71 | 13.86 | 13.63 | 13.51 | 13.42 | 10.40 | 11.39 | 12.23 | 10.37 | 9.99 | 11.83 | 10.98 |
| Kaolizer No. 1 | 0.12 | ← | ← | ← | ← | ← | ← | ← | ← | ← | ← | ← | ← |
| HCFC absorption | | | | | | | | | | | | | |
| HCFC-123 | | | | | | | | | | | | | |
| 0 hr | 25.02 | 25.83 | 25.98 | 25.75 | 25.63 | 25.54 | 22.40 | 22.39 | 24.23 | 22.37 | 21.99 | 23.83 | 22.98 |
| 24 hr | 25.04 | 25.89 | 26.01 | 25.75 | 25.68 | 25.54 | 22.47 | 23.41 | 24.35 | 22.37 | 22.00 | 23.87 | 23.00 |
| Absorption (%) | 0.1 | 0.2 | 0.1 | 0.0 | 0.2 | 0.0 | 0.3 | 0.1 | 0.5 | 0.0 | 0.5 | 0.2 | 0.1 |
| HCFC-141b | | | | | | | | | | | | | |
| 0 hr | 25.02 | 25.83 | 25.98 | 25.75 | 25.63 | 25.54 | 22.40 | 22.39 | 24.23 | 22.37 | 21.99 | 23.83 | 22.98 |
| 24 hr | 25.04 | 25.89 | 25.98 | 25.75 | 25.68 | 25.54 | 22.42 | 23.39 | 24.33 | 22.37 | 22.03 | 23.85 | 22.98 |
| Absorption (%) | 0.1 | 0.2 | 0.0 | 0.0 | 0.2 | 0.0 | 0.1 | 0.0 | 0.4 | 0.0 | 0.2 | 0.1 | 0.0 |

TABLE 7

| | Polyurethane resin (Polyol (A) + Polyol component (C)) | | | | | | | | | | | |
|---|---|---|---|---|---|---|---|---|---|---|---|---|
| | Example | | | | | | | | | | | |
| | 22 | 23 | 24 | 25 | 26 | 27 | 28 | 29 | 30 | 31 | 32 | 33 |
| Polyol (A) | A-1 | A-1 | A-1 | A-5 | A-5 | A-5 | A-1 | A-1 | A-1 | A-5 | A-5 | A-5 |
| Polyol component (C) | C-1 | C-1 | C-1 | C-1 | C-1 | C-1 | C-3 | C-3 | C-3 | C-3 | C-3 | C-3 |
| Mixing ratio (C)/(A) | 1.0 | 2.0 | 4.0 | 1.0 | 2.0 | 4.0 | 1.0 | 2.0 | 4.0 | 1.0 | 2.0 | 4.0 |
| OH-value (mgKOH/g) | 512 | 522 | 530 | 517 | 524 | 532 | 450 | 438 | 429 | 454 | 441 | 431 |
| Viscosity (cp/25° C.) | 15600 | 15200 | 15200 | 15400 | 15300 | 15800 | 16200 | 16900 | 15900 | 16800 | 17000 | |
| Formulation (g) | | | | | | | | | | | | |
| Polyol | 12.00 | ← | ← | ← | ← | ← | ← | ← | ← | ← | ← | ← |
| MDI-CR | 14.91 | 15.20 | 15.44 | 15.06 | 15.26 | 15.00 | 12.99 | 12.64 | 12.37 | 13.10 | 12.72 | 12.43 |
| Kaolizer No. 1 | 0.12 | ← | ← | ← | ← | ← | ← | ← | ← | ← | ← | ← |
| HCFC absorption | | | | | | | | | | | | |
| HCFC-123 | | | | | | | | | | | | |
| 0 hr | 26.91 | 27.20 | 27.44 | 27.06 | 27.26 | 27.50 | 25.11 | 24.76 | 24.49 | 25.22 | 24.84 | 24.55 |
| 24 hr | 27.90 | 27.31 | 27.49 | 27.06 | 27.34 | 27.55 | 25.11 | 24.86 | 24.49 | 25.32 | 24.94 | 24.58 |
| Absorption (%) | | | | | | | | | | | | |
| HCFC-141b | | | | | | | | | | | | |
| 0 hr | 26.91 | 27.20 | 27.44 | 27.06 | 27.26 | 27.50 | 25.11 | 24.76 | 24.49 | 25.22 | 24.84 | 24.55 |
| 24 hr | 27.05 | 27.31 | 27.49 | 27.06 | 27.34 | 27.58 | 25.11 | 24.83 | 24.49 | 25.30 | 24.92 | 24.55 |
| Absorption (%) | 0.5 | 0.4 | 0.2 | 0.0 | 0.3 | 0.3 | 0.0 | 0.3 | 0.0 | 0.3 | 0.3 | 0.0 |

TABLE 8

| | Polyurethane resin (Polyol (A) + Polyol component (C)) | | | | | | | | |
|---|---|---|---|---|---|---|---|---|---|
| | Example | | | | | | | | |
| | 34 | 35 | 36 | 37 | 38 | 39 | 40 | 41 | 42 |
| Polyol (A) | A-8 | A-8 | A-8 | A-6 | A-6 | A-6 | A-3 | A-3 | A-3 |
| Polyol component (C) | C-10 | C-10 | C-10 | C-12 | C-12 | C-12 | C-15 | C-15 | C-15 |
| Mixing ratio (C)/(A) | 1.0 | 2.0 | 4.0 | 1.0 | 2.0 | 4.0 | 1.0 | 2.0 | 4.0 |
| OH-value (mgKOH/g) | 431 | 441 | 450 | 438 | 463 | 483 | 417 | 450 | 478 |
| Viscosity (cp/25° C.) | 13200 | 15100 | 17000 | 18000 | 16500 | 13100 | 15600 | 18700 | 19500 |
| Formulation (g) | | | | | | | | | |
| Polyol | 12.00 | ← | ← | ← | ← | ← | ← | ← | ← |
| MDI-CR | 12.55 | 12.84 | 13.11 | 12.64 | 13.37 | 13.95 | 12.15 | 13.11 | 13.92 |
| Kaolizer No. 1 | 0.12 | ← | ← | ← | ← | ← | ← | ← | ← |
| HCFC absorption | | | | | | | | | |
| HCFC-123 | | | | | | | | | |

TABLE 8-continued

Polyurethane resin (Polyol (A) + Polyol component (C))

| | Example | | | | | | | | |
|---|---|---|---|---|---|---|---|---|---|
| | 34 | 35 | 36 | 37 | 38 | 39 | 40 | 41 | 42 |
| 0 hr | 24.55 | 24.84 | 25.11 | 24.76 | 25.49 | 26.07 | 24.15 | 25.11 | 25.92 |
| 24 hr | 24.58 | 24.87 | 25.12 | 24.81 | 25.51 | 26.07 | 24.17 | 25.11 | 25.97 |
| Absorption (%) | 0.1 | 0.1 | 0.3 | 0.2 | 0.1 | 0.0 | 0.1 | 0.0 | 0.2 |
| HCFC-141b | | | | | | | | | |
| 0 hr | 24.55 | 24.84 | 25.11 | 24.76 | 25.49 | 26.07 | 25.15 | 25.11 | 25.92 |
| 24 hr | 24.58 | 24.87 | 25.16 | 24.78 | 25.49 | 26.07 | 25.15 | 25.11 | 25.95 |
| Absorption (%) | 0.1 | 0.1 | 0.2 | 0.1 | 0.0 | 0.0 | 0.0 | 0.0 | 0.1 |

TABLE 9

Polyurethane resin (Polyol (A) + Polyol component (B) + Polyol component (C))

| | Example | | | |
|---|---|---|---|---|
| | 43 | 44 | 45 | 46 |
| Polyol (A) | A-1 | A-1 | A-1 | A-5 |
| Polyol component (B) | B-2 | B-2 | B-7 | B-8 |
| Polyol component (C) | C-10 | C-10 | C-12 | C-12 |
| Mixing (parts by weight) | | | | |
| Polyol (A) | 50 | 50 | 50 | 50 |
| Polyol component (B) | 25 | 40 | 25 | 25 |
| Polyol component (C) | 25 | 10 | 25 | 25 |
| OH-value (mgKOH/g) | 490 | 501 | 485 | 455 |
| Viscosity (cp/25° C.) | 17200 | 16300 | 11000 | 14200 |
| Formulation (g) | | | | |
| Polyol | 12.00 | ← | ← | ← |
| MDI-CR | 14.27 | 14.59 | 14.13 | 13.25 |
| Kaolizer No. 1 | 0.12 | ← | ← | ← |
| HCFC absorption | | | | |
| HCFC-123 | | | | |
| 0 hr | 26.27 | 26.59 | 26.12 | 25.25 |
| 24 hr | 26.30 | 26.62 | 26.15 | 25.28 |
| Absorption (%) | 0.1 | 0.1 | 0.1 | 0.1 |
| HCFC-141b | | | | |
| 0 hr | 26.27 | 26.59 | 26.12 | 25.25 |
| 24 hr | 26.27 | 26.62 | 26.15 | 25.28 |
| Absorption (%) | 0.0 | 0.1 | 0.1 | 0.1 |

| | Comparative Example | | | |
|---|---|---|---|---|
| | 8 | 9 | 10 | 11 |
| Polyol (A) | A-6 | A-1 | A-1 | A-8 |
| Polyol component (B) or Polyol component (C) | B-2 | C-1 | C-3 | C-10 |
| Mixing ratio [(B) or (C)]/(A) | 5.0 | 5.0 | 5.0 | 5.0 |
| OH-value (mgKOH/g) | 506 | 532 | 427 | 452 |
| Viscosity (cp/25 °C.) | 19900 | 15100 | 17100 | 17500 |
| Formulation (g) | | | | |
| Polyol | 12.00 | ← | ← | ← |
| MDI-CR | 14.74 | 15.50 | 12.44 | 13.17 |

TABLE 9-continued

Polyurethane resin (Polyol (A) + Polyol component (B) + Polyol component (C))

| | Example | | | |
|---|---|---|---|---|
| | 43 | 44 | 45 | 46 |
| Kaolizer No. 1 | 0.12 | ← | ← | ← |
| HCFC absorption | | | | |
| HCFL-123 | | | | |
| 0 hr | 26.74 | 27.50 | 24.44 | 25.17 |
| 24 hr | 26.79 | 27.52 | 24.46 | 25.22 |
| Absorption (%) | 0.2 | 0.1 | 0.1 | 0.2 |
| HCFC-141b | | | | |
| 0 hr | 26.74 | 27.50 | 24.44 | 25.17 |
| 24 hr | 26.79 | 27.52 | 24.46 | 25.22 |
| Absorption (%) | 0.2 | 0.1 | 0.1 | 0.1 |

Rigid Polyurethane Foam Preparation (Table 10~Table 14)

To 100 g of the polyol thus obtained, 1.0 g of water, 1.5 g of silicone surfactant L-5420 (a product of Nippon Unicar Co., Ltd.), 3.0 g of amine catalyst Kaolizer No. 1 (a product of Kao Co., Ltd.) and each amount of CFC or HCFC illustrated in Table 10–Table 14 were added and mixed to obtain a premix. The premix thus obtained was mixed and reacted with each amount of polyisocyanate (MDI-CR, crude diphenylmethanediisocyanate, a product of Mitsui Toatsu Chemicals, Inc.) illustrated in the same tables at the room temperature and poured into a mold to prepare a rigid polyurethane foam.

In the step of preparing the resin premix, mixing and dispersing ability (operational efficiency) between CFC or HCFC and polyol was observed and the closed cell content of the rigid polyurethane foam were measured. Results are illustrated in the same tables.

TABLE 10

Rigid polyurethane foam (polyol (A) only)

| | Example | | | | | | | |
|---|---|---|---|---|---|---|---|---|
| | 47 | 48 | 49 | 50 | 51 | 52 | 53 | 54 |
| Polyol (A) | A-1 | A-2 | A-3 | A-4 | A-5 | A-6 | A-7 | A-8 |
| OH-value (mgKOH/g) | 483 | 392 | 314 | 254 | 492 | 361 | 270 | 398 |
| Viscosity (cp/25° C.) | 15700 | 17800 | 14200 | 21800 | 15600 | 19700 | 13200 | 12700 |
| Formulation (g) | | | | | | | | |
| Polyol | | | | 100.0 | | | | |
| H$_2$O | | | | 1.0 | | | | |
| L-5420 | | | | 1.5 | | | | |
| Kaolizer No. 1 | | | | 3.0 | | | | |
| Foaming agent | 29 | 26 | 24 | 22 | 30 | 25 | 22 | 27 |
| MDI-CR | 143 | 120 | 99 | 83 | 146 | 111 | 87 | 121 |
| Operational efficiency | | | | | | | | |
| CFC-11 | | | | | | | | |
| HCFC-123 | | | | all good | | | | |
| HCFC-141b | | | | | | | | |
| Closed cell (%) | | | | | | | | |
| CFC-11 | 89.2 | 89.1 | 89.0 | 89.5 | 89.0 | 88.9 | 88.7 | 89.0 |
| HCFC-123 | 88.1 | 89.0 | 88.9 | 89.2 | 88.9 | 88.7 | 88.4 | 88.5 |
| HCFC-141b | 88.0 | 89.0 | 88.5 | 89.2 | 88.9 | 88.8 | 88.5 | 88.4 |
| | Comparative Example | | | | | | | |

TABLE 10-continued

| | Rigid polyurethane foam (polyol (A) only) | | | | | | |
|---|---|---|---|---|---|---|---|
| 12 | 13 | 14 | 15 | 16 | 17 | 18 | |
| Polyol (A) | A-9 | A-10 | A-11 | A-12 | A-13 | A-14 | A-15 |
| OH-value (mgKOH/g) | 440 | 560 | 441 | 607 | 395 | 489 | 505 |
| Viscosity (cp/25° C.) | 19000 | 21000 | 9900 | 10000 | 18600 | 52000 | 1200 |
| Formulation (g) | | | | | | | |
| Polyol | | | | 100.0 | | | |
| H₂O | | | | 1.0 | | | |
| L-5420 | | | | 1.5 | | | |
| Kaolizer No. 1 | | | | 3.0 | | | |
| Foaming agent | 28 | 32 | 28 | 33 | 26 | 29 | 30 |
| MDI-CR | 132 | 164 | 132 | 176 | 120 | 145 | 149 |
| Operational efficiency | | | | | | | |
| CFC-11 | good | good | good | good | good | not good | good |
| HCFC-123 | | | | | | | |
| HCFC-141b | | | | | | | |
| Closed cell (%) | | | | | | | |
| CFC-11 | 85.2 | 85.3 | 84.2 | 86.2 | 83.2 | 85.2 | 83.9 |
| HCFC-123 | 83.2 | 84.3 | 83.5 | 83.1 | 83.1 | 82.9 | 82.1 |
| HCFC-141b | 83.6 | 83.7 | 84.1 | 84.5 | 83.9 | 83.0 | 83.1 |

Note:
L-5420: Silicon based regulator
Closed cell content: Beckman air compariosn hydrometer (a product of Toshiba Backmann Comp.)
Foaming agent: 3 foaming tests using CFC-11, HCFC-123 and HCFC-141b were carried out respectively according to the formulation in Table 10. Same amount of foaming agent was used. Operational efficiency and closed cell content of foams obtained were measured respectively. Table 11~14 are the same as Table 10.

TABLE 11

| | Rigid polyurethane foam (polyol (A) * polyol component (B)) | | | | | | | | | | | | |
|---|---|---|---|---|---|---|---|---|---|---|---|---|---|
| | Example | | | | | | | | | | | | |
| | 55 | 56 | 57 | 58 | 59 | 60 | 61 | 62 | 63 | 64 | 65 | 66 | 67 |
| Polyol (A) | A-6 | A-6 | A-6 | A-1 | A-1 | A-1 | A-4 | A-4 | A-4 | A-2 | A-2 | A-5 | A-5 |
| Polyol component (B) | B-2 | B-2 | B-2 | B-7 | B-7 | B-7 | B-7 | B-7 | B-7 | B-8 | B-8 | B-8 | B-8 |
| Mixing ratio ((B)/(A)) | 1.0 | 2.0 | 4.0 | 1.0 | 2.0 | 4.0 | 1.0 | 2.0 | 4.0 | 1.0 | 2.0 | 1.0 | 2.0 |
| OH-value (mgKOH/g) | 447 | 475 | 480 | 472 | 468 | 465 | 357 | 391 | 420 | 356 | 344 | 406 | 377 |
| Viscosity (cp/25° C.) | 19700 | 19800 | 19800 | 14100 | 11900 | 9200 | 20000 | 13100 | 9500 | 16800 | 14100 | 13400 | 12900 |
| Formulation (g) | | | | | | | | | | | | | |
| Polyol | | | | | | | 100.0 | | | | | | |
| H₂O | | | | | | | 1.0 | | | | | | |
| L-5420 | | | | | | | 1.5 | | | | | | |
| Kaolizer No. 1 | | | | | | | 3.0 | | | | | | |
| Foaming agent | 28 | 29 | 29 | 29 | 29 | 29 | 25 | 26 | 27 | 25 | 25 | 27 | 26 |
| MDI-CR | 134 | 141 | 143 | 141 | 140 | 139 | 110 | 119 | 127 | 110 | 107 | 123 | 116 |
| Operational efficiency | | | | | | | all good | | | | | | |
| CFC-11 | | | | | | | | | | | | | |
| HCFC-123 | | | | | | | | | | | | | |
| HCFC-141b | | | | | | | | | | | | | |
| Closed cell (%) | | | | | | | | | | | | | |
| CFC-11 | 89.9 | 89.4 | 89.1 | 89.7 | 89.1 | 89.1 | 89.7 | 89.6 | 89.2 | 89.9 | 88.9 | 88.9 | 89.3 |
| HCFC-123 | 88.2 | 88.4 | 88.5 | 88.5 | 88.4 | 89.0 | 88.5 | 88.9 | 87.9 | 89.7 | 88.3 | 88.4 | 89.0 |
| HCFC-141b | 87.3 | 88.2 | 88.6 | 88.5 | 88.1 | 89.0 | 88.5 | 89.0 | 88.3 | 89.2 | 88.1 | 88.5 | 89.2 |

TABLE 12

| | Rigid polyurethane foam (polyol (A) + polyol component (C) | | | | | | | | | | | |
|---|---|---|---|---|---|---|---|---|---|---|---|---|
| | Example | | | | | | | | | | | |
| | 68 | 69 | 70 | 71 | 72 | 73 | 74 | 75 | 76 | 77 | 78 | 79 |
| Polyol (A) | A-1 | A-1 | A-1 | A-5 | A-5 | A-5 | A-1 | A-1 | A-1 | A-5 | A-5 | A-5 |
| Polyol component (C) | C-1 | C-1 | C-1 | C-1 | C-1 | C-1 | C-3 | C-3 | C-3 | C-3 | C-3 | C-3 |
| Mixing ratio ((C)/(A)) | 1.0 | 2.0 | 4.0 | 1.0 | 2.0 | 4.0 | 1.0 | 2.0 | 4.0 | 1.0 | 2.0 | 4.0 |
| OH-value (mgKOH/g) | 513 | 522 | 530 | 517 | 525 | 532 | 450 | 438 | 429 | 454 | 441 | 431 |
| Viscosity (cp/25° C.) | 15600 | 15200 | 15200 | 15400 | 15300 | 15300 | 15800 | 16200 | 16900 | 15900 | 16800 | 17000 |
| Formulation (g) | | | | | | | | | | | | |
| Polyol | | | | | | 100.0 | | | | | | |
| Hphd 2O | | | | | | 1.0 | | | | | | |
| L-5420 | | | | | | 1.5 | | | | | | |
| Kaolizer No. 1 | | | | | | 3.0 | | | | | | |
| Foaming agent | 30 | 30 | 31 | 30 | 31 | 31 | 28 | 28 | 28 | 28 | 28 | 28 |
| MDI-Cr | 151 | 154 | 156 | 152 | 155 | 156 | 135 | 132 | 129 | 136 | 132 | 130 |
| Operational efficiency | | | | | | all good | | | | | | |
| CFC-11 | | | | | | | | | | | | |
| HCFC-123 | | | | | | | | | | | | |
| HCFC-141b | | | | | | | | | | | | |
| Closed cell (%) | | | | | | | | | | | | |

TABLE 12-continued

Rigid polyurethane foam (polyol (A) + polyol component (C))

| | Example | | | | | | | | | | | |
|---|---|---|---|---|---|---|---|---|---|---|---|---|
| | 68 | 69 | 70 | 71 | 72 | 73 | 74 | 75 | 76 | 77 | 78 | 79 |
| CFC-11 | 89.2 | 89.1 | 89.9 | 89.8 | 89.2 | 89.3 | 89.5 | 89.4 | 89.1 | 89.3 | 89.1 | 89.3 |
| HCFC-123 | 88.1 | 88.2 | 88.4 | 88.4 | 88.3 | 88.2 | 88.3 | 88.4 | 88.9 | 88.9 | 88.7 | 88.9 |
| HCFC-141b | 88.2 | 88.2 | 88.5 | 88.4 | 88.5 | 88.3 | 88.5 | 88.0 | 88.9 | 88.9 | 88.6 | 88.9 |

TABLE 13

Rigid polyurethane foam (polyol (A) ° polyol component (C))

| | Example | | | | | | | | |
|---|---|---|---|---|---|---|---|---|---|
| | 80 | 81 | 82 | 83 | 84 | 85 | 86 | 87 | 88 |
| Polyol (A) | A-8 | A-8 | A-8 | A-6 | A-6 | A-6 | A-3 | A-3 | A-3 |
| Polyol component (C) | C-10 | C-10 | C-10 | C-12 | C-12 | C-12 | C-15 | C-15 | C-15 |
| Mixing ratio ((C)/(A)) | 1.0 | 2.0 | 4.0 | 1.0 | 2.0 | 4.0 | 1.0 | 2.0 | 4.0 |
| OH-value (mgKOH/g) | 461 | 441 | 450 | 438 | 463 | 483 | 417 | 451 | 498 |
| Viscosity (cp/25° C.) | 13200 | 15100 | 17000 | 18000 | 16500 | 13100 | 15600 | 18700 | 19500 |
| Formulation (g) | | | | | | | | | |
| Polyol | | | | | 100.0 | | | | |
| H₂O | | | | | 1.0 | | | | |
| L-5420 | | | | | 1.5 | | | | |
| Kaolizer No. 1 | | | | | 3.0 | | | | |
| Foaming agent | 28 | 28 | 28 | 28 | 29 | 29 | 27 | 28 | 29 |
| MDI-CR | 130 | 132 | 135 | 132 | 138 | 143 | 126 | 135 | 142 |
| Operational efficiency | | | | | all good | | | | |
| CFC-11 | | | | | | | | | |
| HCFC-123 | | | | | | | | | |
| HCFC-141b | | | | | | | | | |
| Closed cell (%) | | | | | | | | | |
| CFC-11 | 89.3 | 89.2 | 89.3 | 89.1 | 89.2 | 89.5 | 89.1 | 89.7 | 89.0 |
| HCFC-123 | 87.9 | 87.9 | 88.3 | 88.6 | 87.9 | 88.6 | 88.7 | 88.4 | 88.9 |
| HCFC-141b | 89.0 | 89.1 | 89.0 | 88.9 | 89.1 | 89.3 | 89.0 | 89.4 | 89.0 |

TABLE 14

Rigid polyurethane foam (polyol (A) + polyol component (B) + polyol component (C))

| | Example | | | |
|---|---|---|---|---|
| | 89 | 90 | 91 | 92 |
| Polyol (A) | A-1 | A-1 | A-1 | A-5 |
| Polyol component (B) | B-2 | B-2 | B-7 | B-8 |
| Polyol component (C) | C-10 | C-10 | C-12 | C-12 |
| Mixing (parts by weight) | | | | |
| Polyol (A) | 50 | 50 | 50 | 50 |
| Polyol component (B) | 25 | 40 | 25 | 25 |
| Polyol component (C) | 25 | 10 | 25 | 25 |
| OH-value (mgKOH/g) | 490 | 501 | 485 | 455 |
| Viscosity (cp/25 °C.) | 17200 | 16300 | 11000 | 14200 |
| Formulation (g) | | | | |
| Polyol | | 100.0 | | |
| H₂O | | 1.0 | | |
| L-5420 | | 1.5 | | |
| Kaolizer No. 1 | | 3.0 | | |
| Foaming agent | 29 | 30 | 29 | 30 |
| MDI-CR | 145 | 148 | 144 | 136 |
| Operational efficiency | | | | |
| CFC-11 | | all good | | |
| HCFC-123 | | | | |
| HCFC-141b | | | | |
| Closed cell (%) | | | | |
| CFC-11 | 89.0 | 89.2 | 89.3 | 89.7 |
| HCFC-123 | 88.6 | 88.5 | 88.4 | 88.9 |
| HCFC-141b | 88.8 | 88.6 | 88.4 | 88.7 |

| | Comparative Example | | | |
|---|---|---|---|---|
| | 19 | 20 | 21 | 22 |
| Polyol (A) | A-6 | A-1 | A-1 | A-8 |
| Polyol comp. (B) or comp. (C) | B-2 | C-1 | C-3 | C-10 |
| Mixing ratio [(B) or (C)]/(A) | 5.0 | 5.0 | 5.0 | 5.0 |
| OH-value (mgKOH/g) | 506 | 532 | 472 | 452 |
| Viscosity (cp/25 °C.) | 19900 | 15100 | 17100 | 17500 |
| Formulation (g) | | | | |
| Polyol | | 100 | | |
| H₂O | | 1.0 | | |

TABLE 14-continued

Rigid polyurethane foam (polyol (A) + polyol component (B) + polyol component (C))

| | Example | | | |
|---|---|---|---|---|
| | 89 | 90 | 91 | 92 |
| L-5420 | | 1.5 | | |
| Kaolizer No. 1 | | 3.0 | | |
| Foaming agent | 30 | 31 | 27 | 28 |
| MDI-CR | 150 | 156 | 129 | 135 |
| Operational efficiency | | | | |
| CFC-11 | | all good | | |
| HCFC-123 | | | | |
| HCFC-141b | | | | |
| Closed cell (%) | | | | |
| CFC-11 | 87.2 | 87.3 | 86.9 | 87.4 |
| HCFC-123 | 84.2 | 86.3 | 84.9 | 84.7 |
| HCFC-141b | 84.3 | 86.5 | 85.0 | 85.0 |

Note: comp.: component (Polyols A-2~A-15, Polyol components) B-1~B-9, Polyol components C-1~C16)

The same procedures as described in polyol(A-1) were carried out. When alkali metal hydroxide was used as a catalyst, the reaction mixture was neutralized with acid. Autoclaves having a content of 2 to 5 l were used depending upon the amount of raw materials.

Polyols A-2 to A-15 (Table 1) are epoxy resin based polyols, polyol components B-1 to B-9 (Tables 2 and 3) are phenol resin initiated polyol components and polyol components C-1 to C-16 (Table are aromatic amine initiated polyol components.

As seen in Table 10 to Table 14, it is found that a single polyol or a mixture thereof obtained by reacting alkylene oxide with a starting material selected from epoxy resin, phenol resin and aromatic amine can maintain, in the polyurethane foam production using HCFC or HFC as a foaming agent, equivalent operational efficiency and foam properties as compared with conventional foam production using a CFC. Rigid polyurethane foam production (Table 15 to Table 24)

Resin premix was prepared according to the formulation illustrated in Tables 15 to Table 24. The resin premix was rapidly mixed at 5000 rpm for 6 seconds with a prescribed amount of an organic polyisocyanate as illustrated in above Tables. The mixture obtained was immediately poured into vertical wooden boxes having dimensions of 200×200×200 mm and 380×380×35 (thickness) mm.

Specimens having dimensions of 80×80×30 mm in size were cut from the former mold and density, compressive strength and low temperature dimensional stability were measured in accordance with JIS A 9514.

A specimen having dimensions of 200×200×25 mm in size were cut from the latter mold and heat conductivity were measured in accordance with JIS A 1412.

Results are illustrated in Tables 15 to 24.

TABLE 15

| | Rigid polyurethane foam (polyol (A) only) | | | | | | | | |
|---|---|---|---|---|---|---|---|---|---|
| | Example | | | | | | | | |
| | 93 | | | 94 | | | 95 | | |
| Low material (g) | | | | | | | | | |
| MDI-CR | 152 | | | 128 | | | 107 | | |
| Polyol (1) | 100 | | | | | | | | |
| Polyol (2) | | | | 100 | | | | | |
| Polyol (3) | | | | | | | 100 | | |
| Polyol (4) | | | | | | | | | |
| Polyol (5) | | | | | | | | | |
| H₂O | 1.5 | | | ← | | | ← | | |
| L-5420 | 1.5 | | | ← | | | ← | | |
| Kaolizer No. 1 | 2.0 | | | 2.0 | | | 1.8 | | |
| Foaming agent | | | | | | | | | |
| CFC-11 | 38 | | | 34 | | | 33 | | |
| HCFC-123 | | 45 | | | 41 | | | 37 | |
| HCFC-141b | | | 32 | | | 28 | | | 26 |
| HFC-134b | | | | | | | | | |
| Physical property of foam | | | | | | | | | |
| Density (kg/m³) (free foaming) | 25.9 | 25.8 | 25.6 | 25.8 | 25.2 | 25.7 | 25.3 | 25.4 | 25.0 |
| Compressive strength (kg/cm³) | 1.62 | 1.42 | 1.38 | 1.64 | 1.50 | 1.52 | 1.63 | 1.39 | 1.45 |
| Raw temperature dimensional stability (%, −30° C. × 24 hr.) | −0.7 | −2.1 | −2.0 | −0.5 | −2.2 | −1.9 | −0.4 | −1.4 | −1.6 |
| Heat conductivity (kcal/mhr °C.) | 0.0161 | 0.0163 | 0.0164 | 0.0162 | 0.0164 | 0.0163 | 0.0163 | 0.0165 | 0.0165 |

| | Example | | | | | |
|---|---|---|---|---|---|---|
| | 96 | | | 97 | | |
| Low material (g) | | | | | | |
| MDI-CR | 91 | | | 154 | | |
| Polyol (1) | | | | | | |
| Polyol (2) | | | | | | |
| Polyol (3) | | | | | | |
| Polyol (4) | 100 | | | | | |
| Polyol (5) | | | | 100 | | |
| H₂O | ← | | | ← | | |
| L-5420 | ← | | | ← | | |
| Kaolizer No. 1 | 3.0 | | | 3.0 | | |
| Foaming agent | | | | | | |
| CFC-11 | 29 | | | 38 | | |
| HCFC-123 | | 34 | | | 46 | |
| HCFC-141b | | | 24 | | | 32 |
| HFC-134b | | | | | | |
| Physical property of foam | | | | | | |
| Density (kg/m³) (free foaming) | 26.1 | 26.0 | 26.1 | 26.1 | 25.9 | 25.1 |
| Compressive strength (kg/cm³) | 1.56 | 1.36 | 1.39 | 1.53 | 1.37 | 1.33 |
| Raw temperature dimensional stability (%, −30° C. × 24 hr.) | −0.4 | −1.6 | −1.5 | −0.5 | −1.7 | −1.4 |
| Heat conductivity (kcal/mhr °C.) | 0.0160 | 0.0162 | 0.0162 | 0.0159 | 0.0163 | 0.0163 |

TABLE 16

| | Rigid polyurethane foam (polyol (A) ° polyol component (B)) | | | | |
|---|---|---|---|---|---|
| | Example | | | | |
| | 98 | 99 | 100 | 101 | 102 |
| Low material (g) | | | | | |
| MDI-CR | 120 | 96 | 129 | 152 | 152 |
| Polyol (1) | 100 | | | | |
| Polyol (2) | | 100 | | | |
| Polyol (3) | | | 100 | | |
| Polyol (4) | | | | 100 | |
| Polyol (5) | | | | | 100 |
| H₂O | 1.5 | ← | ← | ← | ← |
| L-5420 | 1.5 | ← | ← | ← | ← |
| Kaolizer No. 1 | 2.0 | 3.0 | 1.5 | 2.0 | 2.0 |

TABLE 16-continued

Rigid polyurethane foam (polyol (A) ° polyol component (B))

| | Example 98 | | | Example 99 | | | Example 100 | | | Example 101 | Example 102 |
|---|---|---|---|---|---|---|---|---|---|---|---|
| Foaming agent | | | | | | | | | | | |
| CFC-11 | 33 | | | 29 | | | 34 | | | — | — |
| HCFC-123 | | 40 | | | 35 | | | 41 | | 35 | 35 |
| HCFC-141b | | | 27 | | | 24 | | | 29 | — | — |
| HFC-134b | | | | | | | | | | 10 | — |
| Isopentane | | | | | | | | | | — | 10 |
| Physical property of foam | | | | | | | | | | | |
| Density (kg/m$^3$) (free foaming) | 25.3 | 25.2 | 25.1 | 25.3 | 25.3 | 25.1 | 25.4 | 25.2 | 25.7 | 26.3 | 26.4 |
| Compressive strength (kg/cm$^3$) | 1.63 | 1.38 | 1.39 | 1.67 | 1.39 | 1.37 | 1.65 | 1.39 | 1.32 | 1.50 | 1.50 |
| Raw temperature dimensional stability (%, −30° C. × 24 hr.) | −0.2 | −1.5 | −0.9 | −0.3 | −1.7 | −1.6 | −0.3 | −1.7 | −1.5 | −1.5 | |
| Heat conductivity (kcal/mhr °C.) | 0.0159 | 0.0162 | 0.0161 | 0.0160 | 0.0163 | 0.0164 | 0.0160 | 0.0163 | 0.0163 | 0.0163 | 0.0162 |

TABLE 17

| | Example 103 | | | Example 104 | | | Example 105 | | |
|---|---|---|---|---|---|---|---|---|---|
| Low material (g) | | | | | | | | | |
| MDI-CR | 142 | | | 150 | | | 151 | | |
| Polyol (9) | 100 | | | | | | | | |
| Polyol (10) | | | | 100 | | | | | |
| Polyol (11) | | | | | | | 100 | | |
| Polyol (12) | | | | | | | | | |
| Polyol (13) | | | | | | | | | |
| H$_2$O | 1.5 | | | ← | | | ← | | |
| L-5420 | 1.5 | | | ← | | | ← | | |
| Kaolizer No. 1 | 0.5 | | | 0.5 | | | 0.5 | | |
| Foaming agent | | | | | | | | | |
| CFC-11 | 36 | | | 37 | | 38 | | | |
| HCFC-123 | | 44 | | | 45 | | | 45 | |
| HCFC-141b | | | 30 | | | 31 | | | 31 |
| HFC-134b | | | | | | | | | |
| Physical property of foam | | | | | | | | | |
| Density (kg/m$^3$) (free foaming) | 25.4 | 25.1 | 25.3 | 24.9 | 24.7 | 24.9 | 25.3 | 25.1 | 25.1 |
| Compressive strength (kg/cm$^2$) | 1.82 | 1.64 | 1.66 | 1.83 | 1.84 | 1.67 | 1.80 | 1.62 | 1.67 |
| Low temperature dimensional stability (%, −30° C. × 24 hr) | −0.1 | −0.8 | −0.9 | −0.3 | −1.5 | −1.2 | −0.2 | −0.8 | −0.7 |
| Heat conductivity (kcal/mhr °C.) | 0.0158 | 0.0160 | 0.0159 | 0.0159 | 0.0160 | 0.0159 | 0.0156 | 0.0166 | 0.0157 |

| | Example 106 | | | Example 107 | | |
|---|---|---|---|---|---|---|
| Low material (g) | | | | | | |
| MDI-CR | 149 | | | 148 | | |
| Polyol (9) | | | | | | |
| Polyol (10) | | | | | | |
| Polyol (11) | | | | | | |
| Polyol (12) | 100 | | | | | |
| Polyol (13) | | | | 100 | | |
| H$_2$O | ← | | | ← | | |
| L-5420 | ← | | | ← | | |
| Kaolizer No. 1 | 1.0 | | | 1.0 | | |
| Foaming agent | | | | | | |
| CFC-11 | 36 | | | 37 | | |
| HCFC-123 | | 45 | | | 45 | |
| HCFC-141b | | | 31 | | | 31 |
| HFC-134b | | | | | | |
| Physical property of foam | | | | | | |
| Density (kg/m$^3$) (free foaming) | 25.6 | 25.4 | 25.7 | 25.4 | 25.5 | 25.5 |
| Compressive strength (kg/cm$^2$) | 1.87 | 1.62 | 1.68 | 1.88 | 1.63 | 1.69 |
| Low temperature dimensional stability (%, −30° C. × 24 hr) | −0.1 | −0.9 | −0.4 | −0.1 | −0.7 | −0.4 |
| Heat conductivity (kcal/mhr °C.) | 0.0157 | 0.0162 | 0.0157 | 0.0160 | 0.0160 | 0.0160 |

TABLE 18

| | Example 108 | Example 109 | Example 110 |
|---|---|---|---|
| Low material (g) | | | |
| MDI-CR | 147 | 119 | 127 |
| Polyol (14) | 100 | | |
| Polyol (15) | | 100 | |
| Polyol (16) | | | 100 |
| Polyol (17) | | | |
| Polyol (18) | | | |

TABLE 18-continued

| | | | | | | | | | |
|---|---|---|---|---|---|---|---|---|---|
| H₂O | | 1.5 | | | ← | | | ← | |
| L-5420 | | 1.5 | | | ← | | | ← | |
| Kaolizer No. 1 | | 1.0 | | | 4.0 | | | 4.0 | |
| Foaming agent | | | | | | | | | |
| CFC-11 | 37 | | | 33 | | | 34 | | |
| HCFC-123 | | 45 | | | 39 | | | 41 | |
| HCFC-141b | | | 31 | | | 27 | | | 28 |
| HFC-134b | | | | | | | | | |
| Physical property of foam | | | | | | | | | |
| Density (kg/m³) (free foaming) | 25.4 | 25.1 | 25.3 | 24.9 | 24.6 | 24.3 | 25.3 | 25.4 | 26.0 |
| Compressive strength (kg/cm²) | 1.87 | 1.62 | 1.65 | 1.86 | 1.69 | 1.39 | 1.86 | 1.62 | 1.61 |
| Low temperature dimensional stability (%, −30 °C. × 24 hr) | −0.1 | −0.9 | −0.3 | −0.0 | −0.4 | −0.3 | −0.1 | −0.8 | −0.5 |
| Heat conductivity (kcal/mhr °C.) | 0.0160 | 0.0162 | 0.0161 | 0.0161 | 0.0164 | 0.0161 | 0.0162 | 0.0165 | 0.0162 |

| | Example 111 | | | Example 112 | | |
|---|---|---|---|---|---|---|
| Low material (g) | | | | | | |
| MDI-CR | 135 | | | 118 | | |
| Polyol (14) | | | | | | |
| Polyol (15) | | | | | | |
| Polyol (16) | | | | | | |
| Polyol (17) | 100 | | | | | |
| Polyol (18) | | | | 100 | | |
| H₂O | ← | | | ← | | |
| L-5420 | ← | | | ← | | |
| Kaolizer No. 1 | 4.0 | | | 2.0 | | |
| Foaming agent | | | | | | |
| CFC-11 | 35 | | | 33 | | |
| HCFC-123 | | 42 | | | 39 | |
| HCFC-141b | | | 29 | | | 27 |
| HFC-134b | | | | | | |
| Physical property of foam | | | | | | |
| Density (kg/m³) (free foaming) | 25.3 | 24.3 | 24.7 | 25.0 | 24.7 | 24.9 |
| Compressive strength (kg/cm²) | 1.87 | 1.66 | 1.67 | 1.68 | 1.66 | 1.62 |
| Low temperature dimensional stability (%, −30 °C. × 24 hr) | −0.1 | −0.8 | −0.5 | −0.1 | −0.4 | −0.4 |
| Heat conductivity (kcal/mhr °C.) | 0.0159 | 0.0160 | 0.0160 | 0.0158 | 0.0160 | 0.0160 |

TABLE 19

| | Example 113 | | | Example 114 | | | Example 115 | | |
|---|---|---|---|---|---|---|---|---|---|
| Low material (g) | | | | | | | | | |
| MDI-CR | 115 | | | 131 | | | 124 | | |
| Polyol (19) | 100 | | | | | | | | |
| Polyol (20) | | | | 100 | | | | | |
| Polyol (21) | | | | | | | 100 | | |
| Polyol (22) | | | | | | | | | |
| Polyol (23) | | | | | | | | | |
| H₂O | 1.5 | | | ← | | | ← | | |
| L-5420 | 1.5 | | | ← | | | ← | | |
| Kaolizer No. 1 | 2.0 | | | 4.0 | | | 4.0 | | |
| Foaming agent | | | | | | | | | |
| CFC-11 | 32 | | | 35 | | | 34 | | |
| HCFC-123 | | 39 | | | 42 | | | 40 | |
| HCFC-141b | | | 27 | | | 29 | | | 28 |
| HFC-134b | | | | | | | | | |
| Physical property of foam | | | | | | | | | |
| Density (kg/m³) (free foaming) | 25.1 | 24.9 | 25.1 | 25.2 | 24.7 | 25.3 | 25.3 | 25.1 | 25.3 |
| Compressive strength (kg/cm²) | 1.85 | 1.67 | 1.66 | 1.87 | 1.66 | 1.67 | 1.80 | 1.65 | 1.66 |
| Low temperature dimensional stability (%, −30° C. × 24 hr) | −0.0 | −0.4 | −0.4 | −0.3 | −1.3 | −1.3 | −0.7 | −1.2 | −1.1 |
| Heat conductivity (kcal/mhr °C.) | 0.0159 | 0.0160 | 0.0160 | 0.0160 | 0.0162 | 0.0160 | 0.0166 | 0.0167 | 0.0165 |

| | Example 116 | Example 117 |
|---|---|---|
| Low material (g) | | |
| MDI-CR | 156 | 162 |
| Polyol (19) | | |
| Polyol (20) | | |
| Polyol (21) | | |
| Polyol (22) | 100 | |
| Polyol (23) | | 100 |
| H₂O | ← | ← |
| L-5420 | ← | ← |
| Kaolizer No. 1 | 1.0 | 1.0 |
| Foaming agent | | |

TABLE 19-continued

| | | | | | | |
|---|---|---|---|---|---|---|
| CFC-11 | 39 | | | 39 | | |
| HCFC-123 | | 47 | | | 47 | |
| HCFC-141b | | | 32 | | | 33 |
| HFC-134b | | | | | | |
| Physical property of foam | | | | | | |
| Density (kg/m³) (free foaming) | 25.0 | 25.1 | 25.1 | 25.2 | 25.3 | 25.6 |
| Compressive strength (kg/cm²) | 1.83 | 1.62 | 1.65 | 1.83 | 1.67 | 1.66 |
| Low temperature dimensional stability (%, −30° C. × 24 hr) | −0.9 | −1.7 | −1.8 | −0.6 | −1.7 | −1.7 |
| Heat conductivity (kcal/mhr °C.) | 0.0165 | 0.0167 | 0.0165 | 0.0157 | 0.0157 | 0.0157 |

TABLE 20

| | Example 118 | | | Example 119 | | | Example 120 | | |
|---|---|---|---|---|---|---|---|---|---|
| Low material (g) | | | | | | | | | |
| MDI-CR | 164 | | | 161 | | | 162 | | |
| Polyol (24) | 100 | | | | | | | | |
| Polyol (25) | | | | 100 | | | | | |
| Polyol (26) | | | | | | | 100 | | |
| Polyol (27) | | | | | | | | | |
| Polyol (28) | | | | | | | | | |
| H₂O | 1.5 | | | ← | | | ← | | |
| L-5420 | 1.5 | | | ← | | | ← | | |
| Kaolizer No. 1 | 1.0 | | | 3.0 | | | 3.0 | | |
| Foaming agent | | | | | | | | | |
| CFC-11 | 40 | | | 39 | | | 39 | | |
| HCFC-123 | | 48 | | | 47 | | | 47 | |
| HCFC-141b | | | 33 | | | 33 | | | 33 |
| HFC-134b | | | | | | | | | |
| Physical property of foam | | | | | | | | | |
| Density (kg/m³) (free foaming) | 25.3 | 25.2 | 25.3 | 25.4 | 25.3 | 25.4 | 25.4 | 25.3 | 25.3 |
| Compressive strength (kg/cm²) | 1.80 | 1.63 | 1.67 | 1.82 | 1.67 | 1.65 | 1.83 | 1.67 | 1.68 |
| Low temperature dimensional stability (%, −30° C. × 24 hr) | −0.0 | −0.6 | −0.2 | −0.0 | −0.8 | −0.5 | −0.1 | −0.2 | −0.1 |
| Heat conductivity (kcal/mhr °C.) | 0.0157 | 0.0158 | 0.0157 | 0.0156 | 0.0158 | 0.0156 | 0.0160 | 0.0163 | 0.0161 |

| | Example 121 | | | Example 122 | | |
|---|---|---|---|---|---|---|
| Low material (g) | | | | | | |
| MDI-CR | 165 | | | 139 | | |
| Polyol (24) | | | | | | |
| Polyol (25) | | | | | | |
| Polyol (26) | | | | | | |
| Polyol (27) | 100 | | | | | |
| Polyol (28) | | | | 100 | | |
| H₂O | ← | | | ← | | |
| L-5420 | ← | | | ← | | |
| Kaolizer No. 1 | 3.0 | | | 2.0 | | |
| Foaming agent | | | | | | |
| CFC-11 | 40 | | | 36 | | |
| HCFC-123 | | 48 | | | 43 | |
| HCFC-141b | | | 33 | | | 30 |
| HFC-134b | | | | | | |
| Physical property of foam | | | | | | |
| Density (kg/m³) (free foaming) | 25.3 | 25.4 | 25.4 | 25.7 | 25.3 | 25.2 |
| Compressive strength (kg/cm²) | 1.85 | 1.70 | 1.72 | 1.84 | 1.69 | 1.65 |
| Low temperature dimensional stability (%, −30° C. × 24 hr) | −0.4 | −1.3 | −0.1 | −1.0 | −1.7 | −1.6 |
| Heat conductivity (kcal/mhr °C.) | 0.0162 | 0.0162 | 0.0162 | 0.0160 | 0.0161 | 0.0162 |

TABLE 21

| | Example | | |
|---|---|---|---|
| | 123 | 124 | 125 |
| Low material (g) | | | |
| MDI-CR | 147 | 153 | 142 |
| Polyol (24) | 100 | | |
| Polyol (25) | | 100 | |
| Polyol (26) | | | 100 |
| Polyol (27) | | | |
| Polyol (28) | | | |
| H₂O | 1.5 | ← | ← |
| L-5420 | 1.5 | ← | ← |
| Kaolizer No. 1 | 2.0 | 2.0 | 4.5 |
| Foaming agent | | | |
| CFC-11 | 37 | 38 | 36 |

TABLE 21-continued

|  | | | | | | | | | |
|---|---|---|---|---|---|---|---|---|---|
| HCFC-123 |  | 44 |  |  | 45 |  |  | 44 |  |
| HCFC-141b |  |  | 31 |  |  | 32 |  |  | 30 |
| HFC-134b |  |  |  |  |  |  |  |  |  |
| Physical property of foam | | | | | | | | | |
| Density (kg/m³) (free foaming) | 25.4 | 25.4 | 25.7 | 26.0 | 26.0 | 25.9 | 24.9 | 25.2 | 25.3 |
| Compressive strength (kg/cm²) | 1.82 | 1.62 | 1.59 | 1.82 | 1.62 | 1.59 | 1.83 | 1.63 | 1.68 |
| Low temperature dimensional stability (%, −30° C. × 24 hr) | −0.7 | −1.6 | −0.9 | −0.1 | −0.9 | −0.8 | −0.1 | −0.7 | −0.5 |
| Heat conductivity (kcal/mhr °C.) | 0.0162 | 0.0162 | 0.0163 | 0.0162 | 0.0162 | 0.0163 | 0.0162 | 0.0164 | 0.0163 |

|  | Example 126 | | | Example 127 | | |
|---|---|---|---|---|---|---|
| Low material (g) | | | | | | |
| MDI-CR | 149 | | | 149 | | |
| Polyol (24) | | | | | | |
| Polyol (25) | | | | | | |
| Polyol (26) | | | | | | |
| Polyol (27) | 100 | | | | | |
| Polyol (28) | | | | 100 | | |
| H₂O | ← | | | ← | | |
| L-5420 | ← | | | ← | | |
| Kaolizer No. 1 | 4.5 | | | 4.5 | | |
| Foaming agent | | | | | | |
| CFC-11 | 37 | | | 37 | | |
| HCFC-123 |  | 45 |  |  | 45 |  |
| HCFC-141b |  |  | 31 |  |  | 31 |
| HFC-134b | | | | | | |
| Physical property of foam | | | | | | |
| Density (kg/m³) (free foaming) | 25.2 | 25.3 | 25.3 | 25.3 | 25.3 | 25.2 |
| Compressive strength (kg/cm²) | 1.83 | 1.72 | 1.65 | 1.84 | 1.72 | 1.63 |
| Low temperature dimensional stability (%, −30° C. × 24 hr) | −0.6 | −1.2 | −1.1 | −0.0 | −0.3 | −0.1 |
| Heat conductivity (kcal/mhr °C.) | 0.0163 | 0.0164 | 0.0165 | 0.0163 | 0.0164 | 0.0165 |

TABLE 22

|  | Example 128 | | | Example 129 | | | Example 130 | | |
|---|---|---|---|---|---|---|---|---|---|
| Low material (g) | | | | | | | | | |
| MDI-CR | 138 | | | 141 | | | 143 | | |
| Polyol (24) | 100 | | | | | | | | |
| Polyol (25) | | | | 100 | | | | | |
| Polyol (26) | | | | | | | 100 | | |
| Polyol (27) | | | | | | | | | |
| Polyol (28) | | | | | | | | | |
| H₂O | 1.5 | | | ← | | | ← | | |
| L-5420 | 1.5 | | | ← | | | ← | | |
| Kaolizer No. 1 | 0.5 | | | 0.5 | | | 0.5 | | |
| Foaming agent | | | | | | | | | |
| CFC-11 | 36 | | | 36 | | | 36 | | |
| HCFC-123 |  | 43 |  |  | 43 |  |  | 44 |  |
| HCFC-141b |  |  | 30 |  |  | 30 |  |  | 30 |
| HFC-134b | | | | | | | | | |
| Physical property of foam | | | | | | | | | |
| Density (kg/m³) (free foaming) | 26.1 | 25.9 | 25.3 | 26.1 | 25.4 | 25.4 | 26.3 | 25.3 | 25.4 |
| Compressive strength (kg/cm²) | 1.87 | 1.72 | 1.65 | 1.84 | 1.62 | 1.65 | 1.83 | 1.72 | 1.65 |
| Low temperature dimensional stability (%, −30° C. × 24 hr) | −0.5 | −1.7 | −1.2 | −0.5 | −1.4 | −1.2 | −0.7 | −1.2 | −1.1 |
| Heat conductivity (kcal/mhr °C.) | 0.0159 | 0.0161 | 0.0160 | 0.0160 | 0.0160 | 0.0160 | 0.0162 | 0.0163 | 0.0162 |

|  | Example 131 | | | Example 132 | | |
|---|---|---|---|---|---|---|
| Low material (g) | | | | | | |
| MDI-CR | 143 | | | 140 | | |
| Polyol (24) | | | | | | |
| Polyol (25) | | | | | | |
| Polyol (26) | | | | | | |
| Polyol (27) | 100 | | | | | |
| Polyol (28) | | | | 100 | | |
| H₂O | ← | | | ← | | |
| L-5420 | ← | | | ← | | |
| Kaolizer No. 1 | 0.7 | | | 0.7 | | |
| Foaming agent | | | | | | |
| CFC-11 | 27 | | 36 | | | |
| HCFC-123 |  | 44 |  |  | 43 |  |
| HCFC-141b |  |  | 30 |  |  | 30 |
| HFC-134b | | | | | | |
| Physical property of foam | | | | | | |
| Density (kg/m³) (free foaming) | 25.7 | 25.3 | 25.4 | 25.3 | 25.3 | 25.4 |

TABLE 22-continued

| | | | | | | |
|---|---|---|---|---|---|---|
| Compressive strength (kg/cm$^2$) | 1.85 | 1.65 | 1.67 | 1.84 | 1.67 | 1.63 |
| Low temperature dimensional stability (%, −30° C. × 24 hr) | −0.6 | −2.2 | −1.6 | −0.7 | −1.6 | −1.3 |
| Heat conductivity (kcal/mhr °C.) | 0.0163 | 0.0165 | 0.0163 | 0.0165 | 0.167 | 0.0165 |

TABLE 23

| | Example 133 | | | Example 134 | | | Example 135 | | | Example 136 | | |
|---|---|---|---|---|---|---|---|---|---|---|---|---|
| Low material (g) | | | | | | | | | | | | |
| MDI-CR | 135 | | | 144 | | | 141 | | | 138 | | |
| Polyol (39) | 100 | | | | | | | | | | | |
| Polyol (40) | | | | 100 | | | | | | | | |
| Polyol (41) | | | | | | | 100 | | | | | |
| Polyol (42) | | | | | | | | | | 100 | | |
| H$_2$O | 1.5 | | | ← | | | ← | | | ← | | |
| L-5420 | 1.5 | | | ← | | | ← | | | ← | | |
| Kaolizer No. 1 | 0.7 | | | 0.2 | | | 0.2 | | | 0.2 | | |
| Foaming agent | | | | | | | | | | | | |
| CFC-11 | 36 | | | 35 | | | 36 | | | 38 | | |
| HCFC-123 | | 43 | | | 42 | | | 44 | | | 45 | |
| HCFC-141b | | | 30 | | | 29 | | | 30 | | | 31 |
| HFC-134b | | | | | | | | | | | | |
| Physical property of foam | | | | | | | | | | | | |
| Density (kg/m$^3$) (free foaming) | 25.4 | 25.3 | 25.7 | 25.4 | 25.3 | 25.3 | 25.7 | 25.3 | 25.7 | 25.6 | 25.7 | 25.7 |
| Compressive strength (kg/cm$^2$) | 1.82 | 1.63 | 1.67 | 1.83 | 1.63 | 1.67 | 1.85 | 1.63 | 1.70 | 1.84 | 1.69 | 1.74 |
| Low temperature dimensional stability (%, −30° C. × 24 hr) | −0.1 | −0.6 | −0.5 | −0.1 | −0.7 | −0.5 | −0.1 | −0.9 | −0.2 | −0.2 | −0.8 | −0.5 |
| Heat conductivity (kcal/mhr °C.) | 0.0160 | 0.0163 | 0.0162 | 0.0162 | 0.0165 | 0.0163 | 0.0160 | 0.0162 | 0.0161 | 0.0159 | 0.0162 | 0.0161 |

TABLE 24

Polyol (A) + Polyol component (B) + Polyol component (C)

| | Example 137 | | | Example 138 | | | Example 139 | | | Example 140 | | |
|---|---|---|---|---|---|---|---|---|---|---|---|---|
| Low material (g) | | | | | | | | | | | | |
| MDI-CR | 153 | | | 156 | | | 158 | | | 144 | | |
| Polyol (43) | 100 | | | | | | | | | | | |
| Polyol (44) | | | | 100 | | | | | | | | |
| Polyol (45) | | | | | | | 100 | | | | | |
| Polyol (46) | | | | | | | | | | 100 | | |
| H$_2$O | 1.5 | | | ← | | | ← | | | ← | | |
| L-5420 | 1.5 | | | ← | | | ← | | | ← | | |
| Kaolizer No. 1 | 0.5 | | | 0.5 | | | 0.8 | | | 3.0 | | |
| Foaming agent | | | | | | | | | | | | |
| CFC-11 | 38 | | | 38 | | | 38 | | | 37 | | |
| HCFC-123 | | 46 | | | 46 | | | 45 | | | 44 | |
| HCFC-141b | | | 32 | | | 32 | | | 32 | | | 31 |
| HFC-134b | | | | | | | | | | | | |
| Physical property of foam | | | | | | | | | | | | |
| Density (kg/m$^3$) (free foaming) | 26.2 | 25.7 | 25.3 | 26.1 | 26.0 | 25.7 | 25.2 | 25.7 | 25.3 | 25.6 | 25.7 | 25.3 |
| Compressive strength (kg/cm$^2$) | 1.86 | 1.62 | 1.61 | 1.87 | 1.62 | 1.63 | 1.84 | 1.63 | 1.64 | 1.83 | 1.62 | 1.65 |
| Low temperature dimensional stability (%, −30° C. × 24 hr) | −0.1 | −1.2 | −1.1 | −0.2 | −1.3 | −1.4 | −0.4 | −2.1 | −2.0 | −0.4 | −1.8 | −1.6 |
| Heat conductivity (kcal/mhr °C.) | 0.0159 | 0.0161 | 0.0160 | 0.0160 | 0.0163 | 0.0164 | 0.0162 | 0.0163 | 0.0163 | 0.0163 | 0.0162 | 0.0163 |

| | Comparative Example 23 | | | Comparative Example 24 | | | Comparative Example 25 | | | Comparative Example 26 | | |
|---|---|---|---|---|---|---|---|---|---|---|---|---|
| Low material (g) | | | | | | | | | | | | |
| MDI-CR | 140 | | | 172 | | | 140 | | | 184 | | |
| Polyol (CE1) | 100 | | | | | | | | | | | |
| Polyol (CE2) | | | | 100 | | | | | | | | |
| Polyol (CE3) | | | | | | | 100 | | | | | |
| Polyol (CE4) | | | | | | | | | | 100 | | |
| Polyol (CE5) | | | | | | | | | | | | |
| Polyol (CE6) | | | | | | | | | | | | |
| H$_2$O | 1.5 | | | ← | | | ← | | | ← | | |
| L-5420 | 1.5 | | | ← | | | ← | | | ← | | |
| Kaolizer No. 1 | 2.0 | | | 1.0 | | | 4.0 | | | 3.0 | | |
| Foaming agent | | | | | | | | | | | | |
| CFC-11 | 36 | | | 41 | | | 36 | | | 43 | | |
| HCFC-123 | | 43 | | | 49 | | | 43 | | | 51 | |

TABLE 24-continued

| Polyol (A) + Polyol component (B) + Polyol component (C) | | | | | | | | | | | | |
|---|---|---|---|---|---|---|---|---|---|---|---|---|
| HCFC-141b | | | 30 | | 34 | | | 30 | | | 36 | |
| Physical property of foam | | | | | | | | | | | | |
| Density (kg/m³) (free foaming) | 25.4 | 23.2 | 23.2 | 25.7 | 23.7 | 23.8 | 25.4 | 22.9 | 23.5 | 26.1 | 25.7 | 25.8 |
| Compressive strength (kg/cm²) | 1.62 | 1.32 | 1.35 | 1.60 | 1.32 | 1.37 | 1.57 | 1.30 | 1.31 | 1.41 | 1.31 | 1.31 |
| Low temperature dimensional stability (%, −30° C. × 24 hr) | −0.5 | −10.1 | −9.1 | −0.5 | −8.9 | −7.5 | −0.4 | −9.1 | −6.5 | −0.4 | −10.2 | −8.9 |
| Heat conductivity (kcal/mhr °C.) | 0.0171 | 0.0178 | 0.0177 | 0.0170 | 0.0179 | 0.0179 | 0.0172 | 0.0181 | 0.0173 | 0.0173 | 0.0179 | 0.0176 |

| | Comparative Example | | | | | |
|---|---|---|---|---|---|---|
| | 27 | | | 28 | | |
| Lowmaterial (g) | | | | | | |
| MDI-CR | 129 | | | 153 | | |
| Polyol (CE1) | | | | | | |
| Polyol (CE2) | | | | | | |
| Polyol (CE3) | | | | | | |
| Polyol (CE4) | | | | | | |
| Polyol (CE5) | 100 | | | | | |
| Polyol (CE6) | | | | 100 | | |
| H₂O | ← | | | ← | | |
| L-5420 | ← | | | ← | | |
| Kaolizer No. 1 | 0.5 | | | 0.5 | | |
| Foaming agent | | | | | | |
| CFC-11 | 34 | | | 38 | | |
| HCFC-123 | | 41 | | | 46 | |
| HCFC-141b | | | 29 | | | 32 |
| Physical property of foam | | | | | | |
| Density (Kg/m³) (free foamong) | 25.7 | 25.0 | 25.3 | 25.1 | 25.4 | 25.0 |
| Compressive strength (kg/cm²) | 1.47 | 1.37 | 1.32 | 1.52 | 1.31 | 1.32 |
| Low temperature dimensional stability (%, −30° C. × 24 hr) | −0.4 | −12.1 | −7.2 | −0.4 | −10.9 | −8.7 |
| Heat conductivity (Kcal/mhr °C.) | 0.0171 | 0.0178 | 0.0177 | 0.0175 | 0.0183 | 0.0177 |

Note:
CE: Comparative Example

Preparation of prepolymer

Polyol α polyol Obtained by the addition of propylene oxide to glycerol.

Hydroxyl value was 450 mgKOH/g. Viscosity was 480 cp/25 ° C. TRC-90A

Crude tolylene diisocyanate produced by Mitsui Toatsu Chemicals, Inc. NCO content was 39.0%.

Preparation procedure for prepolymer mixture

A mixture of 890 g of TRC-90A and 110 g of polyol α were reacted at 80 ° C. for 2 hours and cooled to room temperature. Prepolymer thus obtained was mixed with 1000 g of MDI-CR to obtain a prepolymer mixture having NCO content of 31.0%.

Results using the prepolymer mixture are illustrated in Table 25.

TABLE 25

| | Example | | | | | | | | | | | |
|---|---|---|---|---|---|---|---|---|---|---|---|---|
| | 141 | | | 142 | | | 143 | | | 144 | | |
| Low material (g) | | | | | | | | | | | | |
| Mixed prepolymer | 152 | | | 117 | | | 120 | | | 142 | | |
| Polyol (1) | 100 | | | | | | | | | | | |
| Polyol (3) | | | | 100 | | | | | | | | |
| Polyol (6) | | | | | | | 100 | | | | | |
| Polyol (9) | | | | | | | | | | 100 | | |
| H₂O | 1.5 | | | 1.5 | | | 1.5 | | | 1.5 | | |
| L-5420 | 1.5 | | | 1.5 | | | 1.5 | | | 1.5 | | |
| Kaolizer No. 1 | 0.2 | | | 0.8 | | | 0.2 | | | 0.2 | | |
| Foaming agent | | | | | | | | | | | | |
| CFC-11 | 38 | | | 33 | | | 33 | | | 36 | | |
| HCFC-123 | | 45 | | | 39 | | | 40 | | | 44 | |
| HCFC-141b | | | 31 | | | 25 | | | 25 | | | 30 |
| HFC-134b | | | | | | | | | 2 | | | |
| Isopentane | | | | | | 2 | | | | | | |
| Physical property of foam | | | | | | | | | | | | |
| Density (kg/m³) (free foaming) | 24.5 | 24.8 | 25.2 | 24.8 | 25.3 | 25.5 | 25.0 | 25.1 | 25.3 | 25.0 | 25.1 | 25.2 |
| Compressive strength (kg/cm²) | 1.51 | 1.32 | 1.26 | 1.50 | 1.32 | 1.27 | 1.50 | 1.30 | 1.24 | 1.50 | 1.30 | 1.20 |
| Low temperature dimensional stability (%, −30° C. × 24 hr) | −0.1 | −0.3 | −0.8 | −0.2 | −0.3 | −0.5 | −0.2 | −0.4 | −1.0 | −0.2 | −0.4 | −1.0 |
| Heat conductivity (kcal/mhr °C.) | 0.0158 | 0.0159 | 0.0161 | 0.0160 | 0.0162 | 0.0164 | 0.0163 | 0.0165 | 0.0167 | 0.0163 | 0.0165 | 0.0167 |

TABLE 25-continued

| | Example | | | | | | | | | | | |
|---|---|---|---|---|---|---|---|---|---|---|---|---|
| | 145 | | | 146 | | | 147 | | | 148 | | |
| Low material (g) | | | | | | | | | | | | |
| Mixed prepolymer | 150 | | | 142 | | | 146 | | | 157 | | |
| Polyol (16) | 100 | | | | | | | | | | | |
| Polyol (22) | | | | 100 | | | | | | | | |
| Polyol (34) | | | | | | | 100 | | | | | |
| Polyol (43) | | | | | | | | | | 100 | | |
| H₂O | 1.5 | | | 1.5 | | | 1.5 | | | 1.5 | | |
| L-5420 | 1.5 | | | 1.5 | | | 1.5 | | | 1.5 | | |
| Kaolizer No. 1 | 1.8 | | | 0.2 | | | 2.2 | | | 2.0 | | |
| Foaming agent | | | | | | | | | | | | |
| CFC-11 | 37 | | | 36 | | | 36 | | | 38 | | |
| HCFC-123 | | 44 | | | 44 | | | 44 | | | 46 | |
| HCFC-141b | | | 31 | | | 30 | | | 31 | | | 32 |
| Physical property of foam | | | | | | | | | | | | |
| Density (kg/m³) (free foaming) | 25.0 | 25.3 | 25.4 | 24.8 | 25.0 | 25.1 | 25.0 | 25.0 | 25.2 | 24.6 | 24.7 | 25.2 |
| Compressive strength (kg/cm²) | 1.55 | 1.38 | 1.30 | 1.30 | 1.15 | 1.18 | 1.65 | 1.40 | 1.38 | 1.50 | 1.25 | 1.19 |
| Low temperature dimensional stability (%, −30° C. × 24 hr) | −0.8 | −1.5 | −1.8 | −0.6 | −1.8 | −2.0 | −0.4 | −1.0 | −1.5 | −0.2 | −0.8 | −1.0 |
| Heat conductivity (kcal/mhr °C.) | 0.0161 | 0.0165 | 0.0163 | 0.0168 | 0.0170 | 0.0171 | 0.0163 | 0.0165 | 0.0165 | 0.0165 | 0.0168 | 0.0170 |

As seen in these results, the polyols of the invention have suitable reactivity. Consequently, the mixture of foaming ingredients does not cause sagging phenomenon, even when it is sprayed on a vertical face material, and can give good appearance on the surface of spray applied foam. Good adhesion of sprayed foam to the facing material can also be obtained. The rigid foam thus obtained has excellent flame retardance and low heat conductivity, and thus provides composite boards having excellent performance.

The formulation of polyols used in the preparation of rigid polyurethane foam are illustrated in Table 1 to Table 4. However, the formulations are not limited to the above embodiment and it is to be understood that the formulations illustrated in Examples 1 to 148 can also be used for the preparation of polyurethane foam composites.

(1) Preparation of rigid polyurethane foam composite having facing material

According to the above examples, preparation of a rigid polyurethane foam composite having facing material of the invention was carried out.

Polyols obtained in examples and comparative examples illustrated in Table 5, Table 6, Table 7 and Table 9 were used as the raw material of rigid polyurethane foams.

The facing material for use in the invention includes, for example, corrugated paper boards, laminated papers and other paper products, polyethylene, polypropylene, polyvinyl chloride and other synthetic resin plates; and aluminum, steel and other metal plates.

1) Polyurethane foam composite having one facing material (Table 26, 27)

The same formulations as illustrated in Table 26 were sprayed on a facing material under the following conditions to prepare a rigid polyurethane foam having one facing material. Properties of the product obtained are summarized in Table 27.

Atomizer: Model—Fee Head D Gum (a product of Gusmer Co., Ltd.)
Output pressure: 50 kg/cm²
Liquid temperature: 40° C.
Facing material: Corrugated paper board

TABLE 26

| | Example | | | | Comparative Ex. | |
|---|---|---|---|---|---|---|
| | 149 | 150 | 151 | 152 | 34 | 35 |
| Formulation (g) | | | | | | |
| MDR-CR | 152 | 152 | 142 | 142 | 124 | 141 |
| Polyol | | | | | | |
| (1) | 100 | 100 | | | | |
| (9) | | | 100 | | | |
| (22) | | | | 100 | | |
| (Comp. Ex. 1) | | | | | 100 | |
| (Comp. Ex. 8) | | | | | | 100 |
| TCEP | 10 | 10 | 10 | 10 | 10 | 10 |
| H₂O | 0.5 | 0.5 | 0.5 | 0.5 | 0.5 | 0.5 |
| L-5420 | 1.5 | 1.5 | 1.5 | 1.5 | 1.5 | 1.5 |
| Kaolizer No. 1 | 1.5 | 1.5 | 3.0 | 1.0 | 1.5 | 1.5 |
| LL-690D | 0.1 | 0.1 | 0.1 | 0.1 | 0.1 | 0.1 |
| CFC-11 | 33 | | | | | |
| HCFC-123 | | 50 | 48 | | 45 | 48 |
| HCFC-141b | | | | 43 | | |

Note:
TCEP: Flame retardant, Tris(2-chloroethyl)phosphate a product of Daihachi Chemical Comp.
LL-690D: Catalyst, Lead Octoate of 40% by weight dioctylphtharate solution

TABLE 27

| | Example | | | | Comparative Exp. | |
|---|---|---|---|---|---|---|
| | 153 | 154 | 155 | 156 | 36 | 37 |
| Reactivity Tack-free time (sec.) | 4~5 | 4~5 | 4~5 | 5 | 5~6 | 5 |
| Sag phenomenon (NOTE) | none | none | none | none | exist | exist |
| Surface appearance Adhesion | | | all good | | | |
| Foam density (kg/m³) | 36.5 | 37.0 | 37.0 | 38.0 | 39.0 | 39.0 |
| Compressive strength (kg/cm³) | 3.33 | 3.35 | 3.25 | 3.25 | 3.10 | 2.95 |

TABLE 27-continued

|  | Example | | | | Comparative Exp. | |
|---|---|---|---|---|---|---|
|  | 153 | 154 | 155 | 156 | 36 | 37 |
| Heat conductivity (kcal/m · hr · °C.)m | 0.0175 | 0.0172 | 0.0176 | 0.0180 | 0.0190 | 0.0188 |
| Combustibility (2) | | | | | | |
| Combustion time (sec.) | 23 | 24 | 23 | 24 | 35 | 33 |
| Burned distance (mm) | 18 | 17 | 18 | 19 | 20 | 21 |

Note:
(1) Sag is a phenomenon where a raw material mixture before curing sags or runs down on a vertical surface when the mixture is sprayed to foam on the surface.
(2) Combustibility (Flame retardation): according to ASTM D 1691

2) Preparation of rigid polyurethane foam having a plurality of facing materials (Table 28, 29)

In the test, rigid polyurethane foam composite boards having two facing materials were prepared with a continuous process under the following conditions by using the formulations illustrated in Table 28.

Properties of the product obtained are summarized in Table 29.

Foaming machine: High pressure foam dispensing machine Model-MQ. (a product of Hennecke Machinen Bau)
Line Speed: 10 m/min
Temperature Material: 30°-40° C. Cure oven: 55° C.
Product: 1 m Width×40 mm Thickness 35 mm Foam layer
Facing material: Laminated paper on the top and bottom

TABLE 28

|  | Example | | | | Comparative Ex. | |
|---|---|---|---|---|---|---|
|  | 157 | 158 | 159 | 160 | 38 | 39 |
| Formulation (g) | | | | | | |
| MDR-CR | 154 | 154 | 149 | 149 | 140 | 158 |
| Polyol | | | | | | |
| (5) | 100 | 100 | | | | |
| (12) | | | 100 | | | |
| (27) | | | | 100 | | |
| (Comp. Ex. 1) | | | | | 100 | |
| (Comp. Ex. 8) | | | | | | 100 |
| TCEP | 10 | 10 | 10 | 10 | 10 | 10 |
| H$_2$O | 1.5 | 1.5 | 1.5 | 1.5 | 1.5 | 1.5 |
| L-5420 | 1.5 | 1.5 | 1.5 | 1.5 | 1.5 | 1.5 |
| Kaolizer No. 1 | 0.2 | 0.2 | 0.3 | 3.0 | 1.0 | 1.0 |
| CFC-11 | 33 | | | | | |
| HCFC-123 | | 46 | 45 | | 43 | 46 |
| HCFC-141b | | | | 43 | | |

TABLE 29

|  | Example | | | | Comparative Exp. | |
|---|---|---|---|---|---|---|
|  | 161 | 162 | 163 | 164 | 40 | 41 |
| Formulation (in TABLE 28) | 157 | 158 | 159 | 160 | 38 | 39 |
| Adhesion between face | all good | | | | | |
| Foam density (kg/m$^3$) | 31.5 | 32.0 | 31.8 | 30.0 | 31.0 | 31.5 |
| Compressive strength (kg/cm$^3$) | 1.53 | 1.50 | 1.60 | 1.55 | 1.05 | 1.00 |
| Flexural strength (kg/cm$^3$) | 2.40 | 2.30 | 2.35 | 2.45 | 1.95 | 1.85 |
| Heat conductivity (kcal/cm$^2$) | 0.0170 | 0.0172 | 0.0173 | 0.0170 | 0.0185 | 0.0186 |
| Combustibility | | | | | | |
| Combustion time (sec.) | 22 | 21 | 21 | 23 | 30 | 31 |
| Burned distance (mm) | 16 | 14 | 15 | 16 | 21 | 20 |

As seen in these results, the polyols of the invention have suitable reactivity in addition to the excellent physical properties. Consequently, the mixture of foaming ingredients does not cause sagging phenomenon, even when it is sprayed on a vertical face material, and can give good appearance on the surface of spray applied foam. Good adhesion of sprayed foam to the facing material can also be obtained. The rigid foam thus obtained has excellent flame retardance and low heat conductivity, and thus provides composite boards having excellent performance.

The formulations used in the preparation of rigid polyurethane foam composites are illustrated in Table 1 and 4. However, the formulations are not limited to the above embodiment and it is to be understood that the formulations illustrated in Examples 1 to 148 can also be used for the preparation of polyurethane foam composites.

What is claimed is:

1. A polyol (A) comprising polyol component (a) and polyol component (b); said polyol component (a) having a number average molecular weight of from 500 to 1800 and an average functionality of from 4 to 12, having at least one residual epoxy group, and being obtained by the addition of an alkylene oxide to a liquid polymer (g2) resulting from the reaction of an active hydrogen containing compound (g) which is one or more compounds selected from the group consisting of glycols, polyhydric alcohols and polysaccharides having a functionality of from 2 to 8, or an alkylene oxide adduct thereof (g1), with an epoxy resin represented by the formula (I):

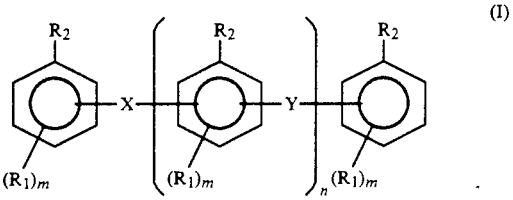

wherein $R_1$ is a hydrogen, alkyl having from 1 to 9 carbon atoms, chlorine, bromine, fluorine or a hydroxy, m is an integer of from 1 to 3, $R_2$ is a glycidyloxy or a glycidylamino, n is an integer of from 0 to 4, X and Y may be the same or different, and are a divalent group selected from the group consisting of an alkylene having from 1 to 10 carbon atoms, xylylene, oxy, thio and sulfonyl, or may be a combination of the above-mentioned groups; said polyol component (b) being obtained by the addition of an alkylene oxide to an active hydrogen containing compound (j), wherein compound (j) may be the same or different than active hydrogen containing compound (g).

2. The polyol (A) of claim 1 wherein the alkylene oxide adduct (g1) is a polyol obtained by adding less than 3 moles of the alkylene oxide per equivalent of the active hydrogen in the active hydrogen containing compound (g).

3. The polyol (A) of claim 1 wherein the polymer (g2) is obtained by reacting the active hydrogen containing compound (g) or the alkylene oxide adduct thereof (g1) of from 0.5 to 2.0 moles per equivalent of epoxy group in the epoxy resin represented by the formula (I).

4. The polyol (A) of claim 1 wherein polyol component (a) is obtained by adding from 0.5 to 3 moles of the alkylene oxide per equivalent of the active hydrogen in the polymer (g2).

5. The polyol (A) of claim 1 wherein the polyol component (b) is obtained by adding from 0.5 to 3.0 moles of alkylene oxide per equivalent of the active hydrogen in the active hydrogen containing compound (j).

6. The polyol (A) of claim 1 wherein the mixing ratio of the polyol component (a) to polyol component (b), the ratio (a)/(b), is from 0.1 to 4.0 by weight.

7. The polyol (A) of claim 1 wherein the active hydrogen containing compound (j) are one or more of compound selected from the group consisting of glycols, polyhydric alcohols, polysaccharides and alkanolamines having a functionality of from 2 to 8 represented by the formula (II):

$$NR_3R_3R_4 \qquad (II)$$

wherein $R_3$ and $R_4$ may be the same or different, and are individually a hydrogen, hydroxyethyl or a hydroxyisopropyl, excluding the case wherein both $R_3$ and $R_4$ are hydrogen atoms.

8. A polyol (D) comprising polyol (A) and phenol resin based polyol component (B) and/or aromatic amine based polyol component (C); said polyol (A) comprising polyol component (a) and polyol component (b); said polyol (a) having a number average molecular weight of from 500 to 1800 and an average functionality of from 4 to 12, having at least one residual epoxy group, and being obtained by the addition of an alkylene oxide to a liquid polymer (g2) resulting from the reaction of an active hydrogen containing compound (g) or an alkylene oxide adduct thereof (g1), with an epoxy resin represented by the formula (I):

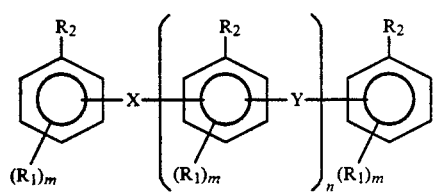

wherein $R_1$ is a hydrogen, alkyl having from 1 to 9 carbon atoms, chlorine, bromine, fluorine or a hydroxy, m is an integer of from 1 to 3, $R_2$ is a glycidyloxy or a glycidylamino, n is an integer of from 0 to 4, and X and Y may be the same or different and are a divalent group selected from the group consisting of an alkylene having from 1 to 10 carbon atoms, xylylene, oxy, thio and sulfonyl, or may be a combination of the above-mentioned groups; said polyol component (b) being obtained by the addition of an alkylene oxide to an active hydrogen containing compound (j), wherein compound (j) may be the same or different than active hydrogen containing compound (g).

9. The polyol (D) of claim 8 wherein the phenol resin based polyol component (B) comprises polyol component (a1) and polyol component (b1) or polyol component (c1); said polyol component (a1) having a hydroxyl value of from 145 to 350 mg KOH/g and being obtained by the addition of from 1.0 to 4.5 moles of the alkylene oxide to one equivalent of a hydroxy group in a phenol resin having a number average molecular weight of from 650 to 1400, an average functionality of from 3 to 8, and represented by the formula (III):

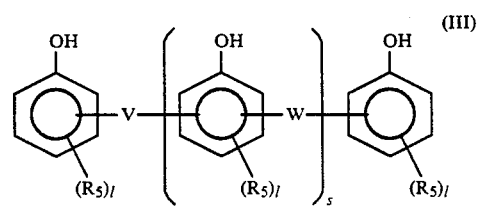

wherein $R_5$ is a hydrogen, alkyl having from 1 to 9 carbon atoms, chlorine, bromine, fluorine or hydroxy, is an integer of from 1 to 3, s is an integer of from 1 to 6, V and W are the same or different divalent group selected from the group consisting of an alkylene having from 1 to 10 carbon atoms, xylylene, oxy, thio and sulfonyl, or may be a combination of the above-mentioned groups; said polyol component (b1) having a hydroxyl value of from 240 to 800 mg KOH/g and being obtained by the addition of from 0.5 to 3.0 moles of the alkylene oxide to one equivalent of the active hydrogen in one or more of alkanolamine represented by the formula (II):

$$NR_3R_3R_4 \qquad (II)$$

wherein $R_3$ and $R_4$ may be the same or different, and are individually a hydrogen, hydroxyethyl or a hydroxyisopropyl, excluding the case wherein both $R_3$ and $R_4$ are hydrogen; said polyol component (c1) having a hydroxyl value of from 130 to 750 mg KOH/g and being obtained by the addition of from 0.5 to 6.5 moles of the alkylene oxide to one equivalent of the hydroxyl group in one or more of the active hydrogen containing compound selected from the group consisting of aliphatic polyhydroxy compounds having an average functionality of from 2 to 8.

10. The polyol (D) of claim 9 wherein the phenol resin is a novolak resin having the formula (III) wherein $R_5$ is a hydrogen and both V and W are methylene.

11. The polyol (D) of claim 10 wherein the novolak resin has a number average molecular weight of from 650 to 900, average functionality of from 3 to 8, and a softening point of from 75° to 115° C.

12. The polyol (D) of claim 8 wherein the aromatic amine based polyol component (C) comprises polyol component (a2) and polyol component (b1) or polyol component (c1); said polyol component (a2) being obtained by the addition of from 1.0 to 9.0 moles of the alkylene oxide to one equivalent of the active hydrogen in the aromatic amine represented by the formula (IV) or formula (V):

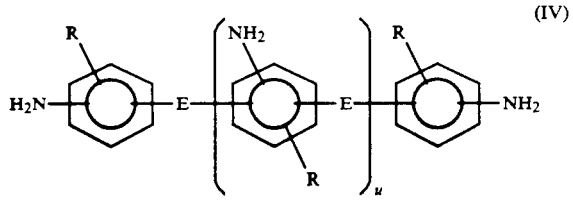

wherein E is methylene, xylylene or ethylidene, R is a hydrogen, aliphatic hydrocarbon group having from 1 to 10 carbon atoms or alicyclic hydrocarbon group, and u is an integer of from 0 to 5,

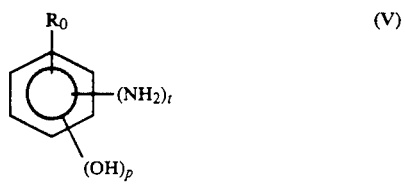

wherein $R_0$ is a hydrogen, chlorine, bromine, fluorine, aliphatic hydrocarbon group having from 1 to 10 carbon atoms or alicylic hydrocarbon group, t is an integer of from 1 to 3, and p is an integer of from 0 to 2; said polyol component (b1) being obtained by the addition of from 0.5 to 3.0 moles of the alkylene oxide to one equivalent of the active hydrogen in the alkanolamine represented by the formula (II):

$$NR_3R_3R_4 \qquad (II)$$

wherein $R_3$ and $R_4$ may be the same or different, and are individually a hydrogen, hydroxyethyl or hydroxyisopropyl, excluding the case wherein both $R_3$ and $R_4$ are hydrogen; said polyol component (c1) being obtained by the addition of from 0.5 to 6.5 moles of the alkylene oxide to one equivalent of the active hydrogen in an aliphatic polyhydroxy compound.

13. The polyol (D) of claim 8 wherein the ratio [polyol component (B)+polyol component (C)]/polyol (A) is in the range of from 0.1 to 4.0 by weight, and the proportion of polyol component (B) and polyol component (C) in the mixture satisfies the relation, polyol component (B)=100-polyol component (C).

14. The polyol (D) of claim 8 wherein the ratio (a)/(b) in the polyol (A) is from 0.1 to 4.0 by weight, the ratio (a1)/(b1) and (a1)/(c1) in the polyol component (B) are from 0.25 to 4.0 by weight and from 0.1 to 4.0 by weight respectively, and the ratio (a2)/(b1) and (a2)/(c1) in the polyol component (C) are from 0.25 to 4.0 by weight and from 0.1 to 4.0 by weight respectively.

15. A polyurethane resin obtained by reacting a polyol with an organic polyisocyanate comprising using the polyol (A) of claim 1 as said polyol.

16. A polyurethane resin obtained by reacting a polyol with an organic polyisocyanate comprising using the polyol (D) of claim 8 as said polyol.

17. The polyurethane resin of claim 15 or claim 16 wherein a portion or the whole of the organic polyisocyanate comprises a prepolymer of the organic polyisocyanate.

18. The polyurethane resin of claim 15 or claim 16 wherein the equivalent ratio of the isocyanate group in the organic polyisocyanate to the hydroxyl group in the polyol is in the range of from 0.8 to 5.0.

19. A rigid polyurethane foam obtained by the reaction of an organic polyisocyanate with a resin premix comprising a polyol, foaming agent, catalyst and cell regulator, said polyol comprising polyol (A) according to claim 1, and said foaming agent being selected from the group consisting of hydrochlorofluorocarbons, hydrofluorocarbons, and mixtures thereof.

20. A rigid polyurethane foam according to claim 19, wherein said resin premix further comprises an auxiliary foaming agent, said auxiliary foaming agent being selected from water, low boiling point compounds, or mixtures thereof.

21. A rigid polyurethane foam obtained by the reaction of an organic polyisocyanate with a resin premix comprising a polyol, foaming agent, catalyst and cell regulator, said polyol comprising polyol D according to claim 8, and said foaming agent being selected from the group consisting of hydrochlorofluorocarbons, hydrofluorocarbons and mixtures thereof.

22. A rigid polyurethane foam according to claim 21, wherein said resin premix further comprises an auxiliary foaming agent selected from water, low boiling point compounds, or mixtures thereof.

23. A process comprising preparing a rigid polyurethane foam, said rigid polyurethane foam being obtained by the reaction of an organic polyisocyanate with a resin premix comprising a polyol, foaming agent, catalyst and cell regulator, said polyol comprising polyol (A) according to claim 1, and said foaming agent being selected from the group consisting of hydrochlorofluorocarbons, hydrofluorocarbons and mixtures thereof.

24. A process according to claim 23, wherein said resin premix further comprises an auxiliary foaming agent, said auxiliary foaming agent being selected from water, low boiling point compounds, or mixtures thereof.

25. A process comprising preparing a rigid polyurethane foam, said rigid polyurethane foam being obtained by the reaction of an organic polyisocyanate with a resin premix comprising a polyol, foaming agent, catalyst and cell regulator, said polyol comprising polyol D according to claim 8, and said foaming agent being selected from the group consisting of hydrochlorofluorocarbons, hydrofluorocarbons, and mixtures thereof.

26. A process according to claim 25, wherein said resin premix further comprises an auxiliary foaming agent selected from water, low boiling point compounds, or mixtures thereof.

27. A process for preparing a rigid polyurethane foam composite comprising forming a rigid polyurethane foam on a face material or in a cavity surrounded by a plurality of face materials, wherein said polyurethane foam is obtained by the reaction of an organic polyisocyanate with a resin premix comprising a polyol, foaming agent, catalyst and cell regulator, said polyol comprising polyol (A) according to claim 1, and said foaming agent being selected from the group consisting of hydrochlorofluorocarbons, hydrofluorocarbons and mixtures thereof.

28. A process according to claim 27, wherein said resin premix further comprises an auxiliary foaming agent, said auxiliary foaming agent being selected from water, low boiling point compounds, or mixtures thereof.

29. A process for preparing a rigid polyurethane foam composite comprising forming a rigid polyurethane foam on a face material or in a cavity surrounded by a plurality of face materials, wherein said polyurethane foam is obtained by the reaction of an organic polyisocyanate with a resin premix comprising a polyol, foaming agent, catalyst and cell regulator, said polyol comprising polyol D according to claim 8, and said foaming agent being selected from the group consisting of hydrochlorofluorocarbons, hydrofluorocarbons and mixtures thereof.

30. A process according to claim 27, wherein said resin premix further comprises an auxiliary foaming agent selected from water, low boiling point compounds, or mixtures thereof.

31. The rigid polyurethane foam of claim 19 or claim 21 wherein the hydrochlorofluorocarbon is 2,2-dichloro-1,1,1-trifluoroethane, 1,1-dichloro-1-fluoroethane, 1-chloro-1,1-difluoroethane or 1-chloro-1,1-difluoromethane and the hydrofluorocarbon is 1,1,1,2-tetrafluoroethane or 1,1-difluoroethane.

32. The rigid polyurethane foam of claim 19 or claim 21 wherein a portion or the whole of the organic polyisocyanate comprises a prepolymer of the organic polyisocyanate.

33. The rigid polyurethane foam of claim 19 or claim 21 wherein the equivalent ratio of the isocyanate group in the organic polyisocyanate to the hydroxyl group in the polyol is in the range of from 0.8 to 5.0.

34. A preparation process of the rigid polyurethane foam of claim 23 or claim 25 wherein the hydrochlorofluorocarbon is 2,2-dichloro-1,1,1-trifluoroethane, 1,1-dichloro-1-fluoroethane, 1-chloro-1,1-difluoroethane or 1-chloro-1,1-difluoromethane and the hydrofluorocarbon is 1,1,1,2-tetrafluoroethane or 1,1-difluoroethane.

35. The preparation process of the rigid polyurethane foam of claim 23 or claim 25 wherein a portion or the whole of the organic polyisocyanate comprises a prepolymer of the organic polyisocyanate.

36. The preparation process of the rigid polyurethane foam of claim 23 or claim 25 wherein the equivalent ratio of the isocyanate group in the organic polyisocyanate to the hydroxyl group in the polyol is in the range of from 0.8 to 5.0.

37. The preparation process of claim 27 or claim 29 wherein the rigid polyurethane foam is formed in a plurality of face material by spreading, pouring or spraying.

38. The preparation process of claim 27 or claim 29 wherein the rigid polyurethane foam is formed on a face material by spraying.

39. The preparation process of claim 27 or claim 29 wherein the hydrochlorofluorocarbon is 2,2-dichloro-1,1,1-trifluoroethane, 1,1-dichloro-1-fluoroethane, 1-chloro-1,1-difluoroethane or 1-chloro-1,1-difluoromethane and the hydrofluorocarbon is 1,1,1,2-tetrafluoroethane or 1,1-difluoroethane.

40. The preparation process of claim 27 or claim 29 wherein a portion or the whole of the organic polyisocyanate comprises a prepolymer of the organic polyisocyanate.

41. The preparation process of claim 27 or claim 29 wherein the equivalent ratio of the isocyanate group in the organic polyisocyanate to the hydroxyl group in the polyol is in the range of from 0.8 to 5.0.

* * * * *